United States Patent
Rabinowitz et al.

(10) Patent No.: US 6,559,800 B2
(45) Date of Patent: May 6, 2003

(54) POSITION LOCATION USING BROADCAST ANALOG TELEVISION SIGNALS

(75) Inventors: Matthew Rabinowitz, Palo Alto, CA (US); James J. Spilker, Jr., Woodside, CA (US)

(73) Assignee: Rosum Corporation, Redwood City, CA (US)

( * ) Notice: Subject to any disclaimer, the term of this patent is extended or adjusted under 35 U.S.C. 154(b) by 0 days.

(21) Appl. No.: 10/054,302

(22) Filed: Jan. 22, 2002

(65) Prior Publication Data

US 2002/0145565 A1 Oct. 10, 2002

Related U.S. Application Data

(63) Continuation-in-part of application No. 09/887,158, filed on Jun. 21, 2001, now abandoned.
(60) Provisional application No. 60/265,675, filed on Feb. 2, 2001, provisional application No. 60/281,270, filed on Apr. 3, 2001, provisional application No. 60/281,269, filed on Apr. 3, 2001, provisional application No. 60/293,812, filed on May 25, 2001, provisional application No. 60/293,813, filed on May 25, 2001, and provisional application No. 60/343,819, filed on Oct. 23, 2001.

(51) Int. Cl.$^7$ .................................................. G01S 3/02
(52) U.S. Cl. ....................................... 342/457; 342/464
(58) Field of Search ................................ 342/450, 457, 342/458, 464, 465

(56) References Cited

U.S. PATENT DOCUMENTS

| | | |
|---|---|---|
| 4,555,707 A | 11/1985 | Connelly |
| 5,045,861 A | 9/1991 | Duffett-Smith |
| 5,157,686 A | 10/1992 | Omura et al. |
| 5,166,952 A | 11/1992 | Omura et al. |
| 5,481,316 A | 1/1996 | Patel |
| 5,510,801 A | 4/1996 | Engelbrecht et al. |
| 5,920,284 A | 7/1999 | Victor |
| 6,078,284 A | 6/2000 | Levanon |
| 6,094,168 A | 7/2000 | Duffett-Smith et al. |
| 6,107,959 A | 8/2000 | Levanon |
| 6,137,441 A | 10/2000 | Dai et al. |
| 6,317,500 B1 | 11/2001 | Murphy |
| 6,373,432 B1 | 4/2002 | Rabinowitz et al. |
| 6,374,177 B1 | 4/2002 | Lee et al. |

OTHER PUBLICATIONS

Parkinson, B.W., et al., "Autonomous GPS Integrity Monitoring Using the Pseudorange Residual," *Journal of the Institute of Navigation* (1988), vol. 35, No. 2, pp. 255–274.

Rabinowitz, M., "Differential Carrier Phase Navigation System Combining GPS with Low Earth Orbit Satellites for Rapid Resolution of Integer Cycle Ambiguities," *PhD Thesis for Department of Electrical Engineering, Stanford University* (Dec. 2000), pp. 59–73.

Spilker, Jr., J.J., "Fundamentals of Signal Tracking Theory," *Global Positioning System: Theory and Applications* (1994), vol. 1, Chapter 7, pp. 245–327.

Van Dierendock, A.J., "GPS Receivers," *Global Positioning System: Theory and Applications* (1995), vol. 1, Chapter 8, pp. 329–407.

*Primary Examiner*—Dao Phan
(74) *Attorney, Agent, or Firm*—Richard A. Dunning, Jr.

(57) ABSTRACT

A computer program product, apparatus, and method for determining the position of a user terminal. It includes receiving, at the user terminal, a broadcast analog television signal having a periodic component; and correlating the broadcast analog television signal with a predetermined reference signal based on the periodic component, thereby producing a pseudorange; and wherein the location of the user terminal is determined based on the pseudorange and a location of the transmitter of the broadcast analog television signal.

52 Claims, 22 Drawing Sheets

POSITION LOCATION USING BROADCAST ANALOG TELEVISION SIGNALS

CROSS-REFERENCE TO RELATED APPLICATIONS

This application is a continuation-in-part of U.S. Nonprovisional patent application Ser. No. 09/887,158, "Position Location using Broadcast Digital Television Signals," by Matthew Rabinowitz and James J. Spilker, filed Jun. 21, 2001 now abandoned, the disclosure thereof incorporated by reference herein.

This application claims the benefit of U.S. Provisional Patent Applications Serial No. 60/265,675, "System and Method for Navigation and/or Data Communication Using Satellite and/or Terrestrial Infrastructure," by Matthew Rabinowitz and James J. Spilker, filed Feb. 2, 2001; Serial No. 60/281,270, "Use of the ETSI DVB Terrestrial Digital TV Broadcast Signals For High Accuracy Position Location in Mobile Radio Links," by James J. Spilker, filed Apr. 3, 2001; Serial No. 60/281,269, "An ATSC Standard DTV Channel For Low Data Rate Broadcast to Mobile Receivers," by James J. Spilker and Matthew Rabinowitz, filed Apr. 3, 2001; Serial No. 60/293,812, "DTV Monitor System Unit (MSU)," by James J. Spilker and Matthew Rabinowitz, filed May 25, 2001; Serial No. 60/293,813, "DTV Position Location Range And SNR Performance," by James J. Spilker and Matthew Rabinowitz, filed May 25, 2001; and Serial No. 60/343,819, "Processing Analog Television Signals for Positioning Applications," by Matthew Rabinowitz, filed Oct. 23, 2001. The subject matter of all of the foregoing are incorporated herein by reference.

BACKGROUND

The present invention relates generally to position determination, and particularly to position determination using analog broadcast television signals.

There have long been methods of two-dimensional latitude/longitude position location systems using radio signals. In wide usage have been terrestrial systems such as Loran C and Omega, and a satellite-based system known as Transit. Another satellite-based system enjoying increased popularity is the Global Positioning System (GPS).

Initially devised in 1974, GPS is widely used for position location, navigation, survey, and time transfer. The GPS system is based on a constellation of 24 on-orbit satellites in sub-synchronous 12 hour orbits. Each satellite carries a precision clock and transmits a pseudo-noise signal, which can be precisely tracked to determine pseudo-range. By tracking 4 or more satellites, one can determine precise position in three dimensions in real time, world-wide. More details are provided in B. W. Parkinson and J. J. Spilker, Jr., Global Positioning System-Theory and Applications, Volumes I and II, AIAA, Washington, D.C. 1996.

GPS has revolutionized the technology of navigation and position location. However in some situations, GPS is less effective. Because the GPS signals are transmitted at relatively low power levels (less than 100 watts) and over great distances, the received signal strength is relatively weak (on the order of −160 dBw as received by an omni-directional antenna). Thus the signal is marginally useful or not useful at all in the presence of blockage or inside a building.

A system has been proposed using conventional analog National Television System Committee (NTSC) television signals to determine position. This proposal is found in a U.S. Patent entitled "Location Determination System And Method Using Television Broadcast Signals," U.S. Pat. No. 5,510,801, issued Apr. 23, 1996. However, the techniques disclosed suffer from several major shortcomings. The techniques cannot use signals which are severely attenuated, such that conventional analog TV receivers cannot extract synchronization timing from the horizontal synch or chrominance burst. The techniques cannot accommodate the frequency offset and the short-term instability of the analog transmitter clocks, which would cause severe position errors because the user must sequentially sample one channel after another. The techniques cannot resolve cycle ambiguities in the chrominance carrier, especially in the presence of multipath. Further, the techniques do not enable one to use signals which have variable characteristics that do not effect the performance of an analog television receiver, but considerably affect the performance of a navigation system (for example, the variable shape and duration of the blanking pulse, the horizontal synch pulse, and the chrominance burst).

SUMMARY

Implementations of the present invention describe signal processing techniques for position location using analog broadcast television (TV) Signals. These techniques can track signals which are below the noise floor, and for which a conventional television signal receiver would be unable to acquire timing information. These techniques extract timing information in a manner far more precise than a typical television receiver. These techniques also accommodate all the variable characteristics of the analog TV signal, such that these variations do not affect the precision of position location.

These techniques are usable in the vicinity of analog TV transmitters with a range from the transmitter much greater than the typical analog TV reception range. Because of the high power of the analog TV signals, these techniques can even be used indoors by handheld receivers, and thus provide a solution to the position location needs of the Enhanced 911 (E911) system.

In general, in one aspect, the invention features a computer program product, apparatus, and method for determining the position of a user terminal. It includes receiving, at the user terminal, a broadcast analog television signal having a periodic component; and correlating the broadcast analog television signal with a predetermined reference signal based on the periodic component, thereby producing a pseudorange; and wherein the location of the user terminal is determined based on the pseudorange and a location of the transmitter of the broadcast analog television signal.

Particular implementations can include one or more of the following features. Implementations include determining the location of the user terminal based on the pseudorange and the location of the transmitter of the broadcast analog television signal. Implementations include receiving parameters describing the predetermined reference signal; and generating the predetermined reference signal based on the parameters. The periodic component can be a horizontal synchronization pulse. Implementations include identifying the peak of the result of the correlating, thereby producing the pseudorange. Implementations include receiving parameters describing the derivative of the periodic component; generating the predetermined reference signal based on the parameters; and identifying the first zero crossing of the result of the correlating, thereby producing the pseudorange. The periodic component is selected from the group comprising a horizontal synchronization pulse; a horizontal blanking pulse; and a horizontal blanking pulse and a horizontal synchronization pulse. Implementations include correlating the broadcast analog television signal with a second predetermined reference signal, the second predetermined reference signal based on the horizontal synchronization pulse, thereby producing a second correlation result; identifying the peak of the second correlation result, thereby producing a second pseudorange; and producing a refined pseudorange based on the pseudorange and the second pseudorange; and wherein the position of the user terminal is determined based on the refined pseudorange and the location of the transmitter of the broadcast analog television signal. The periodic component is a chrominance burst, and implementations include resolving ambiguity in the pseudorange resulting from cycle ambiguity in the chrominance burst. Implementations include correlating the broadcast analog television signal with a second predetermined reference signal, the second predetermined reference signal based on the horizontal synchronization pulse, thereby producing a second correlation result; producing a second pseudorange based on the second correlation result; and producing a refined pseudorange based on the pseudorange and the second pseudorange; and wherein the position of the user terminal is determined based on the refined pseudorange and the location of the transmitter of the broadcast analog television signal. Implementations include receiving parameters describing the derivative of a second periodic component; generating the predetermined reference signal based on the parameters; and identifying the first zero crossing of the result of the correlating, thereby producing the pseudorange; and wherein the second periodic component is selected from the group comprising a horizontal synchronization pulse, a horizontal blanking pulse, and a horizontal blanking pulse and a horizontal synchronization pulse. The position of the user terminal is determined by adjusting the pseudoranges based on a difference between a transmitter clock at the transmitter of the broadcast analog television signal and a known time reference, and determining the position of the user terminal based on the adjusted pseudorange and the location of the TV transmitter. Implementations include determining a further pseudorange based on a further broadcast analog television signal; and projecting the pseudorange and the further pseudorange to an instant of time, thereby eliminating any first order term in the clock of the user terminal.

The details of one or more implementations are set forth in the accompanying drawings and the description below. Other features will be apparent from the description and drawings, and from the claims.

Figure 1:
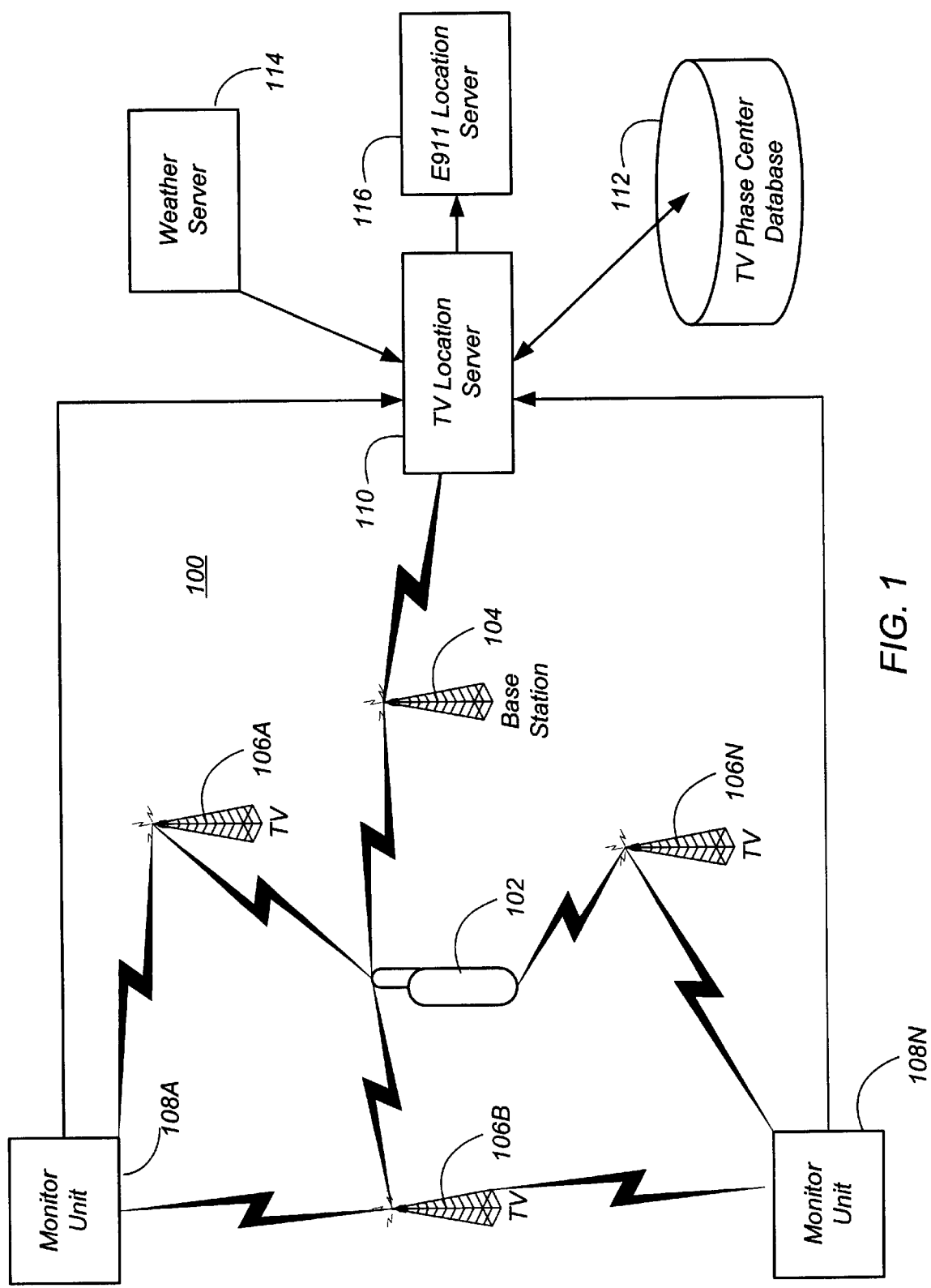
FIG. 1 shows an example implementation including a user terminal that communicates over an air link with a base station.

The leading digit(s) of each reference numeral used in this specification indicates the number of the drawing in which the reference numeral first appears.

DETAILED DESCRIPTION

As used herein, the terms "client" and "server" generally refer to an electronic device or mechanism, and the term "message" generally refers to an electronic signal representing a digital message. As used herein, the term "mechanism" refers to hardware, software, or any combination thereof. These terms are used to simplify the description that follows. The clients, servers, and mechanisms described herein can be implemented on any standard general-purpose computer, or can be implemented as specialized devices.

Implementations of the invention are described below with reference to the NTSC (National Television System Committee) standard, which has been adopted in the United States, Canada, Mexico and elsewhere. However, the techniques disclosed herein are also applicable to analog TV signals of other formats, as will be apparent to one skilled in the relevant arts after reading this description.

In contrast to the digital pseudo-noise codes of GPS, the TV signals are received from transmitters only a few miles distant, and the transmitters broadcast signals at levels up to the megawatt level. In addition the TV antennas have significant antenna gain. Thus there is often sufficient power to permit TV signal reception inside buildings.

Referring to FIG. 1, an example implementation 100 includes a user terminal 102 that communicates over an air link with a base station 104. In one implementation, user terminal 102 is a wireless telephone and base station 104 is a wireless telephone base station. In one implementation, base station 104 is part of a mobile MAN (metropolitan area network) or WAN (wide area network).

FIG. 1 is used to illustrate various aspects of the invention but the invention is not limited to this implementation. For example, the phrase "user terminal" is meant to refer to any object capable of implementing the TV position location described. Examples of user terminals include PDAs, mobile phones, cars and other vehicles, and any object which could include a chip or software implementing TV position location. It is not intended to be limited to objects which are "terminals" or which are operated by "users."

Position Location Performed by a TV Location Server

Figure 2:
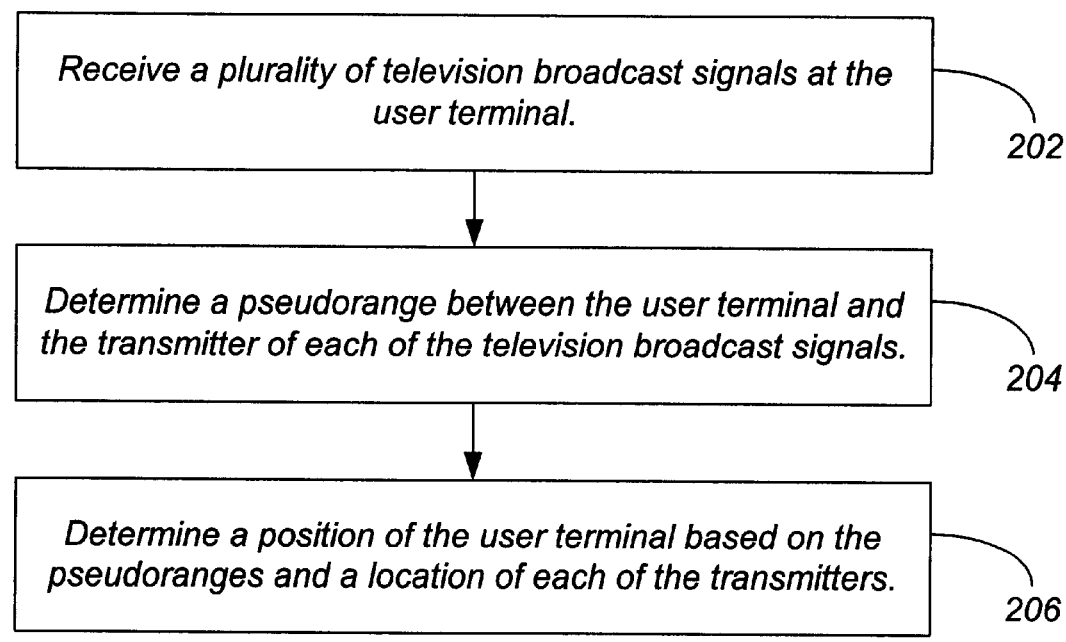
FIG. 2 illustrates an operation of the implementation of FIG. 1.

FIG. 2 illustrates an operation of implementation 100. User terminal 102 receives TV signals from a plurality of TV transmitters 106A and 106B through 106N (step 202). Various methods can be used to select which TV channels to use in position location. In one implementation, a TV location server 110 tells user terminal 102 of the best TV channels to range from. In one implementation, user terminal 102 exchanges messages with TV location server 110 by way of base station 104. In one implementation user terminal 102 selects TV channels to monitor based on the identity of base station 104 and a stored table correlating base stations and TV channels. In another implementation, user terminal 102 can accept a location input from the user that gives a general indication of the area, such as the name of the nearest city; and uses this information to select TV channels for processing. In one implementation, user terminal 102 scans available TV channels to assemble a fingerprint of the location based on power levels of the available TV channels. User terminal 102 compares this fingerprint to a stored table that matches known fingerprints with known locations to determine the location and to select TV channels for processing. In another implementation, the user terminal 102 takes pseudorange measurements on all of the available signals, and communicates these pseudoranges to location server 110, which determines the position of the user terminal 102 based on the locations of the TV transmitters 106.

User terminal 102 determines a pseudo-range between the user terminal 102 and each TV transmitter 106 (step 204). Each pseudo-range represents the time difference (or equivalent distance) between a time of transmission from a transmitter 108 of a component of the TV broadcast signal and a time of reception at the user terminal 102 of the component, as well as a clock offset between the user terminal and the monitor units 108, and a clock offset in the time of transmission of the component of the TV broadcast signal.

User terminal 102 transmits the pseudo-ranges to TV location server 110. In one implementation, TV location server 110 is implemented as a general-purpose computer executing software designed to perform the operations described herein. In another implementation, TV location server 110 is implemented as an ASIC (application-specific integrated circuit). In one implementation, TV location server 110 is implemented within or near base station 104.

The TV signals are also received by a plurality of monitor units 108A through 108N. Each monitor unit can be implemented as a small unit including a transceiver and processor, and can be mounted in a convenient location such as a utility pole, TV transmitters 106, or base stations 104. In one implementation, monitor units are implemented on satellites.

Each monitor unit 108 measures the TV signals it receives, and generates a set of parameters that characterize those signals. The monitor stations transmit these parameters to the user terminals 102, which use the parameters to generate reference signals. The user terminals correlate the TV signals they receive with the reference signals to obtain a pseudorange to each TV transmitter. The pseudoranges are used, either by user terminal 102 or by a TV location server 110, to determine the location of the user terminal 102.

Each monitor unit 108 measures, for each of the TV transmitters 106 from which it receives TV signals, a time offset between the local clock of that TV transmitter and a reference clock. In one implementation the reference clock is derived from GPS signals. The use of a reference clock permits the determination of the time offset for each TV transmitter 106 when multiple monitor units 108 are used, since each monitor unit 108 can determine the time offset with respect to the reference clock. Thus, offsets in the local clocks of the monitor units 108 do not affect these determinations.

In another implementation, no external time reference is needed. According to this implementation, a single monitor unit receives TV signals from all of the same TV transmitters as does user terminal 102. In effect, the local clock of the single monitor unit functions as the time reference.

In one implementation, each time offset is modeled as a fixed offset. In another implementation each time offset is modeled as a second order polynomial fit of the form $$\text{Offset} = a + b(t-T) + c(t-T)^2 \tag{1}$$

that can be described by a, b, c, and T. In either implementation, each measured time offset is transmitted periodically to the TV location server using the Internet, a secured modem connection or the like. In one implementation, the location of each monitor unit 108 is determined using GPS receivers.

TV location server 110 receives information describing the phase center (i.e., the location) of each TV transmitter 106 from a database 112. In one implementation, the phase center of each TV transmitter 106 is measured by using monitor units 108 at different locations to measure the phase center directly. In another implementation, the phase center of each TV transmitter 106 is measured by surveying the antenna phase center.

In one implementation, TV location server 110 receives weather information describing the air temperature, atmospheric pressure, and humidity in the vicinity of user terminal 102 from a weather server 114. The weather information is available from the Internet and other sources such as NOAA. TV location server 110 determines tropospheric propagation velocity from the weather information using techniques such as those disclosed in B. Parkinson and J. Spilker, Jr. Global Positioning System-Theory and Applications, AIAA, Washington, D.C., 1996, Vol. 1, Chapter 17 Tropospheric Effects on GPS by J. Spilker, Jr.

TV location server 110 can also receive from base station 104 information which identifies a general geographic location of user terminal 102. For example, the information can identify a cell or cell sector within which a cellular telephone is located. This information is used for ambiguity resolution, as described below.

Figure 3:
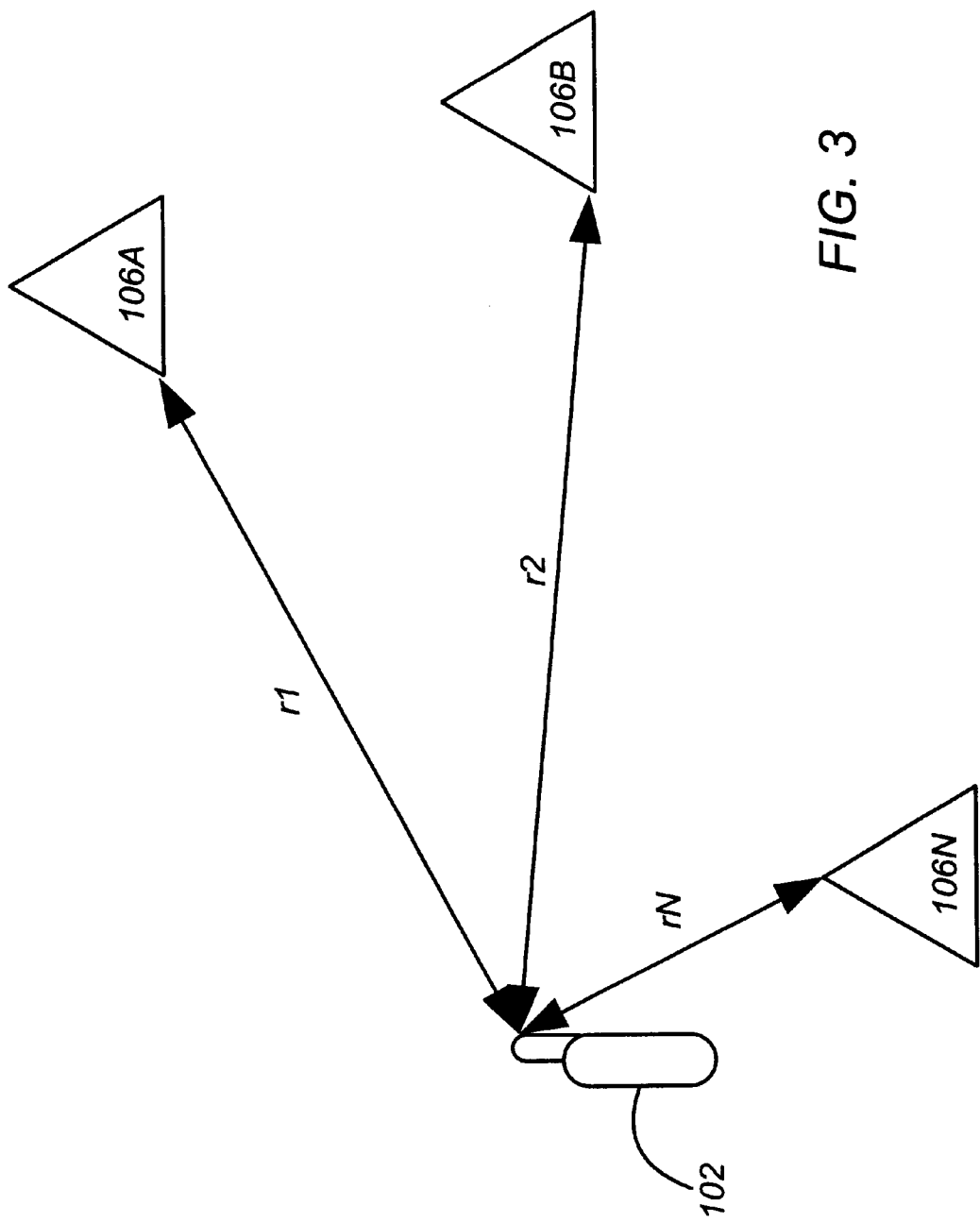
FIG. 3 depicts the geometry of a position determination using three TV transmitters.

In one implementation, TV location server 10 determines a position of the user terminal based on the pseudo-ranges and a location of each of the transmitters (step 206). FIG. 3 depicts the geometry of a position determination using three TV transmitters 106. TV transmitter 106A is located at position (x1, y1). The range between user terminal 102 and TV transmitter 106A is r1. TV 106B transmitter is located at position (x2, y2). The range between user terminal 102 and TV transmitter 106B is r2. TV transmitter 106N is located at position (xN, yN). The range between user terminal 102 and TV transmitter 106N is rN.

TV location server 110 may adjust the value of each pseudo-range according to the tropospheric propagation velocity. In addition, the TV location server will adjust the pseudoranges for the clock offset for the corresponding TV transmitter 106 as described in equation (1) above. For example, assume that the TV transmitters 106 have clock offsets which result in frequency offsets of roughly 1 part in $10^6$, and one second separates the pseudorange measurements at the user terminal 102 for transmitters 106A and 106N. If these measurements are not corrected according to the clock offset as modeled in equation (1), an effective distance error of roughly 300 meters between the two measurements will result. The TV location server 110 uses the phase center information from database 112 to determine the position of each TV transmitter 106.

Now a simplified position location process is described, where it is assumed that the clock offset of the user device can be modeled by a single constant offset T. This assumption is true if the user clock is stabilized using a clock reference from the cellular base station or a stable TV transmitter. User terminal 102 makes three or more pseudo-range measurements to solve for three unknowns, namely the position (x, y) and clock offset T of user terminal 102. In other implementations, the techniques disclosed herein are used to determine position in three dimensions such as longitude, latitude, and altitude, and can include factors such as the altitude of the TV transmitters.

Now a simplified position location process is described, where it is assumed that the clock offset of the user device can be modeled by a single constant offset T. This assumption is true if the user measurements are projected to the same instant of time, or if the user clock is stabilized using a clock reference from the cellular base station or a stable DTV transmitter. User terminal 102 makes three or more pseudo-range measurements to solve for three unknowns, namely the position (x, y) and clock offset T of user terminal 102. In other implementations, the techniques disclosed herein are used to determine position in three dimensions such as longitude, latitude, and altitude, and can include factors such as the altitude of the DTV transmitters.

The three pseudo-range measurements pr1, pr2 and prN are given by $$pr1=r1+T \qquad (2a)$$

$$pr2=r2+T \qquad (3a)$$

$$prN=rN+T \qquad (4a)$$

where we have assumed that the clock offset T is in units of distance. Namely, T represents a timing offset multiplied by the speed of light. The three ranges can be expressed as $$r1=|X-X1| \qquad (5)$$

$$r2=|X-X2| \qquad (6)$$

$$rN=|X-XN| \qquad (7)$$

where X represents the two-dimensional vector position (x, y) of user terminal, X1 represents the two-dimensional vector position (x1, y1) of DTV transmitter 106A, X2 represents the two-dimensional vector position (x2, y2) of DTV transmitter 106B, and XN represents the two-dimensional vector position (xN, yN) of DTV transmitter 106N. These relationships produce three equations in which to solve for the three unknowns x, y, and T.

Now, techniques for projecting the measurements at the user terminal 102 to a common instant in time are described. Note that this is not necessary if the clock of the user terminal 102 is stabilized or corrected using a signal from the cellular base station or a DTV transmitter 106. When the user clock is not stabilized, or corrected, the user clock offset can be considered to be a function of time, T(t). For a small time interval, Δ, the clock offset, T(t), can be modeled by a constant and a first order term. Namely, $$T(t+\Delta) = T(t) + \frac{\partial T}{\partial t}\Delta \qquad (8)$$

We now reconsider equations (2a)–(4a) treating the clock offset as a function of time. Consequently, the pseudorange measurements are also a function of time. For clarity, we assume that the ranges remain essentially constant over the interval Δ. The pseudorange measurements may then be described as:

$$pr1(t1)=r1+T(t1) \qquad (2b)$$

$$pr2(t2)=r2+T(t2) \qquad (3b)$$

$$prN(tN)=rN+T(tN) \qquad (4b)$$

In one embodiment, the user terminal 102 commences with an additional set of pseudorange measurements at some time Δ after the initial set of measurements. These measurements may be described:

$$pr1(t1+\Delta) = r1 + T(t1) + \frac{\partial T}{\partial t}\Delta \qquad (2c)$$

$$pr2(t2+\Delta) = r2 + T(t2) + \frac{\partial T}{\partial t}\Delta \qquad (3c)$$

$$prN(tN+\Delta) = rN + T(tN) + \frac{\partial T}{\partial t}\Delta \qquad (4c)$$

The user terminal 102 then projects all the pseudorange measurements to some common point in time so that the effect of the first order term is effectively eliminated. For example, consider if some common reference time t0 is used. Applying equations (2b–4b) and (2c–4c) it is straightforward to show that we can project the measurements to a common instant of time as follows:

$$pr1(t0)=pr1(t1)+[pr1(t1+\Delta)-pr1(t1)](t0-t1)/\Delta \qquad (2d)$$

$$pr2(t0)=pr2(t2)+[pr2(t2+\Delta)-pr2(t2)](t0-t2)/\Delta \qquad (3d)$$

$$prN(t0)=prN(tN)+[prN(tN+\Delta)-prN(tN)](t0-tN)/\Delta \qquad (4d)$$

These projected pseudorange measurements are communicated to the location server where they are used to solve the three unknowns x, y, and T. Note that the projection in equations (2d–4d) is not precise, and second order terms are not accounted for. However the resulting errors are not significant. One skilled in the art will recognize that second order and higher terms may be accounted for by making more than two pseudorange measurements for each projection. Notice also that there are many other approaches to implementing this concept of projecting the pseudorange measurements to the same instant of time. One approach, for example, is to implement a delay lock loop such as those disclosed in J. J. Spilker, Jr., Digital Communications by Satellite, Prentice-Hall, Englewood Cliffs, N.J., 1977, 1995 and B. W. Parkinson and J. J. Spilker, Jr., Global Positioning System-Theory and Application, Volume 1, AIAA, Washington, D.C. 1996, both incorporated by reference herein. A separate tracking loop can be dedicated to each DTV transmitter 106. These tracking loops effectively interpolate between pseudorange measurements. The state of each of these tracking loops is sampled at the same instant of time.

In another implementation, user terminal 102 does not compute pseudo-ranges, but rather takes measurements of the TV signals that are sufficient to compute pseudo-range, and transmits these measurements to TV location server 110. TV location server 110 then computes the pseudo-ranges based on the measurements, and computes the position based on the pseudo-ranges, as described above.

Position Location Performed by User Terminal

In another implementation, the position of user terminal 102 is computed by user terminal 102. In this implementation, all of the necessary information is transmitted to user terminal 102. This information can be transmitted to user terminal by TV location server 110, base station 104, one or more TV transmitters 106, or any combination thereof. User terminal 102 then measures the pseudo-ranges and solves the simultaneous equations as described above. This implementation is now described.

User terminal 102 receives the time offset between the local clock of each TV transmitter and a reference clock. User terminal 102 also receives information describing the phase center of each TV transmitter 106 from a database 112.

User terminal 102 receives the tropospheric propagation velocity computed by TV locations server 110. In another implementation, user terminal 102 receives weather information describing the air temperature, atmospheric pressure, and humidity in the vicinity of user terminal 102 from a weather server 114 and determines tropospheric propagation velocity from the weather information using conventional techniques.

User terminal 102 can also receive from base station 104 information which identifies the rough location of user terminal 102. For example, the information can identify a cell or cell sector within which a cellular telephone is located. This information is used for ambiguity resolution, as described below.

User terminal 102 receives TV signals from a plurality of TV transmitters 106 and determines a pseudo-range between the user terminal 102 and each TV transmitter 106. User terminal 102 then determines its position based on the pseudo-ranges and the phase centers of the transmitters.

In any of these of the implementations, should only two TV transmitters be available, the position of user terminal 102 can be determined using the two TV transmitters and the offset T computed during a previous position determination. The values of T can be stored or maintained according to conventional methods.

In one implementation, base station 104 determines the clock offset of user terminal 102. In this implementation, only two TV transmitters are required for position determination. Base station 104 transmits the clock offset T to TV location server 110, which then determines the position of user terminal 102 from the pseudo-range computed for each of the TV transmitters.

In another implementation, when only one or two TV transmitters are available for position determination, GPS is used to augment the position determination.

Monitor Unit

Figure 4:
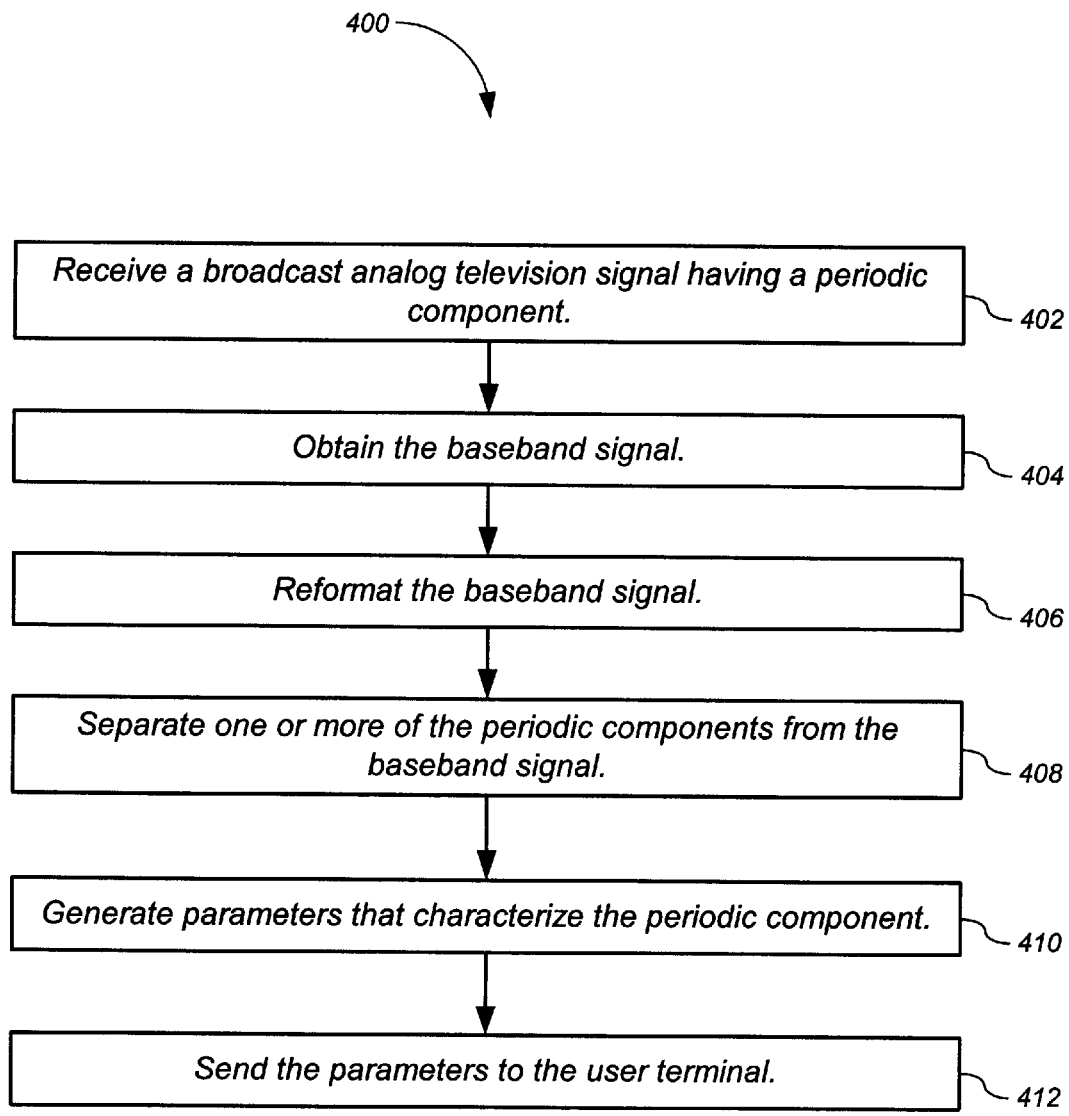
FIG. 4 shows a process performed by a monitor unit according to one implementation.

FIG. 4 shows a process 400 performed by a monitor unit 108 according to one implementation. Monitor unit 108 receives a broadcast analog TV signal that conventionally includes a periodic component (step 402). In various implementations the periodic component used includes the horizontal blanking pulse, the horizontal synchronization pulse, and the chrominance burst. Monitor unit 108 then obtains a baseband signal from the received TV signal (step 404).

Figure 5:
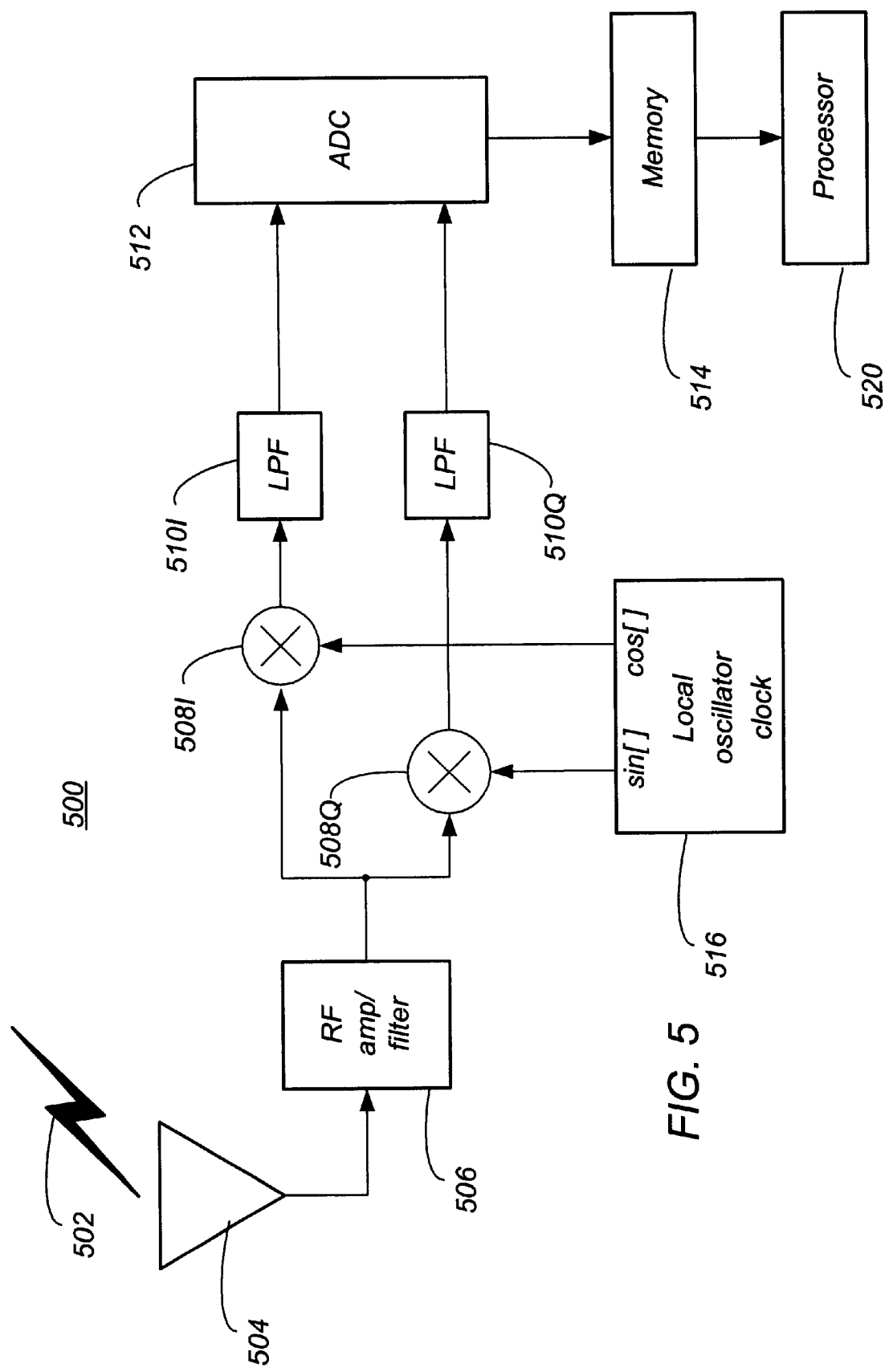
FIG. 5 depicts a receiver for use in taking samples of received broadcast analog TV signals according to one implementation.

FIG. 5 depicts a receiver 500 for use in taking samples of received broadcast analog TV signals according to one implementation. Techniques for implementing such a receiver in a small wireless device are described in U.S. Provisional Patent Application Serial No. 60/309,267, "Methodology and System for Tracking the Digital Television Signal with Application to Positioning Wireless Devices," by James Omura, James J. Spilker Jr., and Matthew Rabinowitz, filed Jul. 31, 2001. These techniques can be used in the receiver within the user terminal as well. In one implementation, sampler 500 is implemented within user terminal 102 and within monitor units 108. The sampling rate is sufficiently high to obtain an accurate representation of the TV signal, as would be apparent to one skilled in the art.

Figure 6:
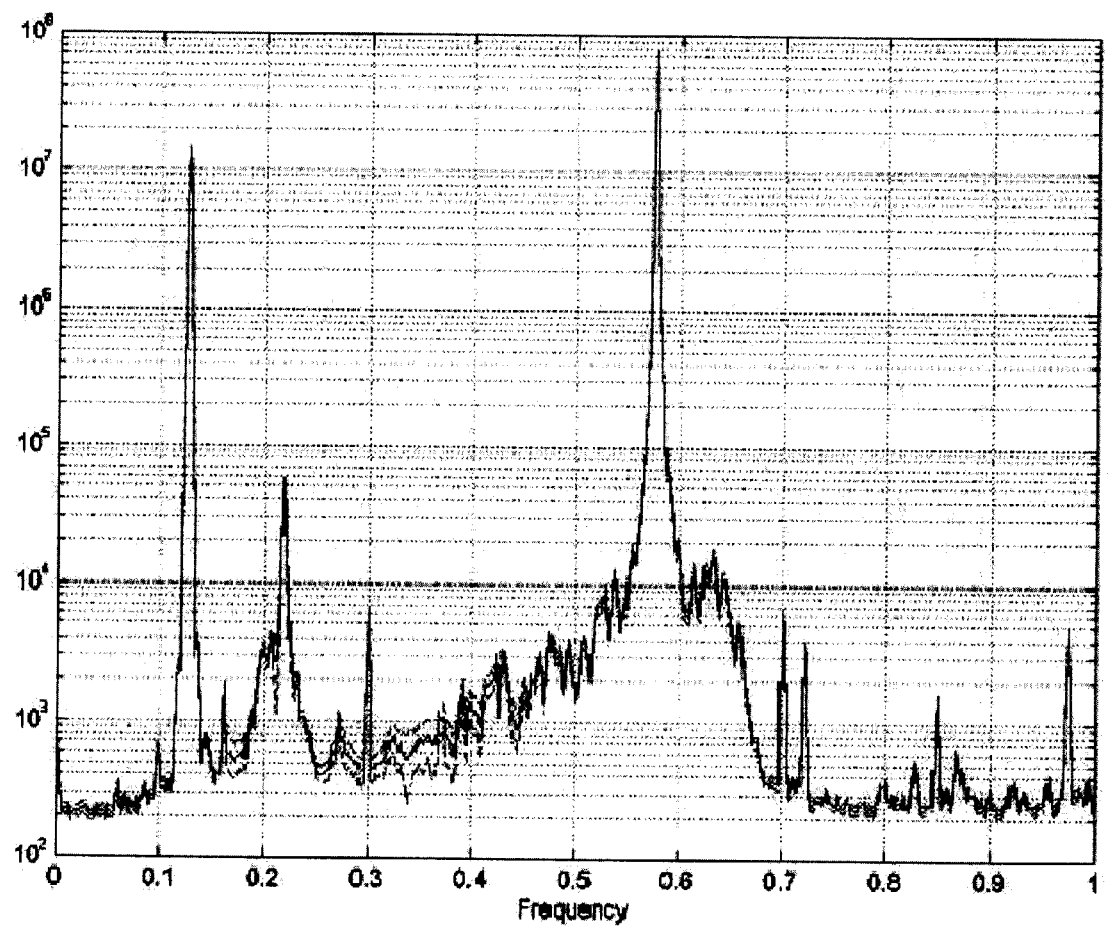
FIG. 6 shows an example spectrum of the digitized TV signal.

Receiver 500 receives a TV signal 502 at an antenna 504. A radio frequency (RF) amp/filter 506 amplifies and filters the received TV signal. A local oscillator clock 516 and mixers 508I and 508Q downconvert the signal to produce in-phase (I) and quadrature (Q) samples, respectively. The I and Q samples are respectively filtered by low-pass filters (LPF) 510I and 510Q. One approach to performing the downconversion is to use a direct down-conversion architecture where the signals are converted directly down to baseband. This allows very inexpensive RF (radio frequency) hardware, and enables the filters 510 to effectively reject adjacent channel interference. An analog-to-digital converter (ADC) 512 converts the I and Q samples to digital form. The digital I and Q samples are stored in a memory 514. FIG. 6 shows an example spectrum of the digitized signal, where the signal has been down-converted to an intermediate center frequency of 44 MHz and then sampled at 20 megasamples per second (MSps). The stored digitized signal is then processed by a processor 520 comprising conventional hardware, software or a combination of hardware and software.

Figure 7:
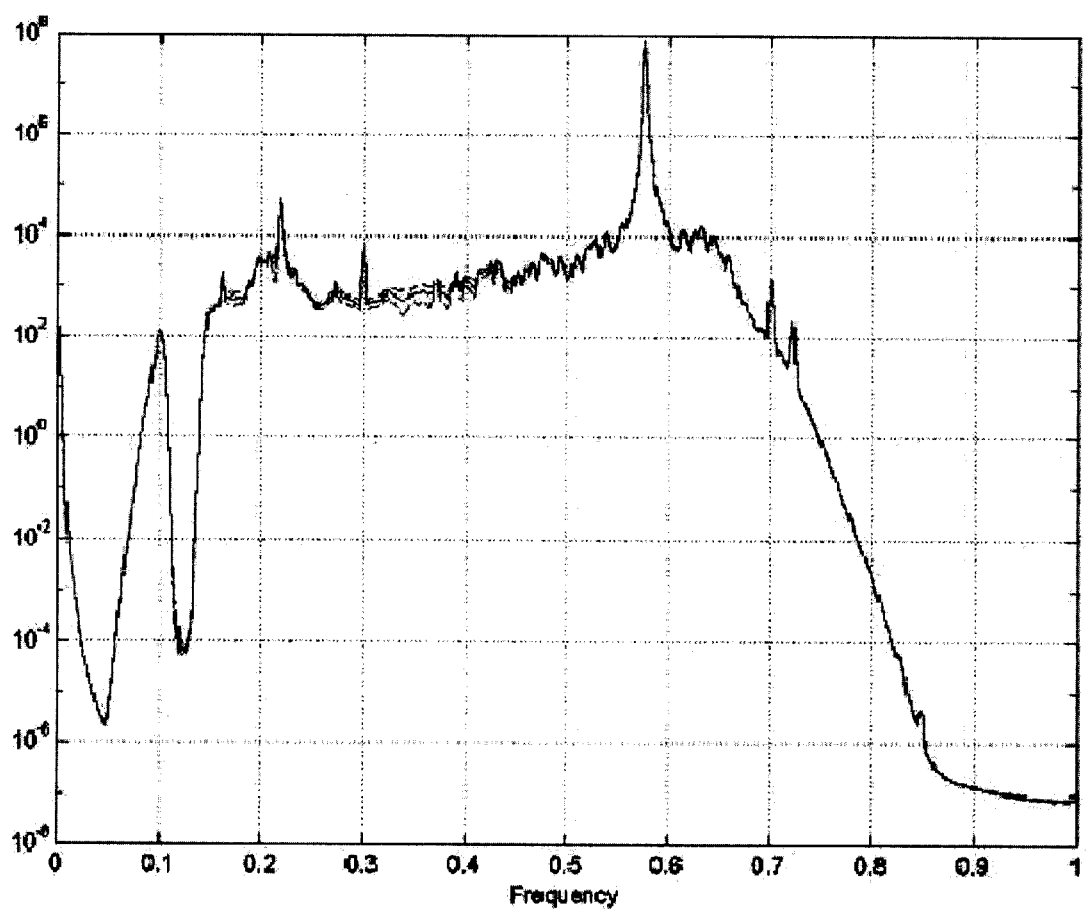
FIG. 7 shows the spectrum of the digitally filtered TV signal.

Processor 520 digitally band-pass filters the signal to a 6 MHz bandwidth in order to eliminate the unwanted disturbance, and notch-filters the signal to remove the frequency-modulated audio signal. FIG. 7 shows the spectrum of the resulting digitally filtered TV signal. The audio carrier is found 0.25 MHz below the upper edge of the analog television channel. Due to the mixing procedure used in down-conversion, the spectrum of the signal has been flipped, so the audio signal is found at a digital frequency of 0.125. Many other approaches may be implemented to obtain this signal, as will be apparent to one skilled in the relevant art after reading this description.

The filtered analog TV signal is denoted by $s_f(t)$. The video carrier of an analog TV signal is nominally 1.25 MHz above the lower edge of the analog channel. With the down-conversion process described, the video carrier can be seen in FIG. 7 at a digital frequency of 0.575, corresponding to an analog frequency $\omega_v=5.75$ MHz. Processor 520 creates an in-phase mixing signal $$s_{mix\_i}(t) = \cos(\omega_v t) \tag{9}$$

and a quadrature mixing signal $$s_{mix\_q}(t) = \sin(\omega_v t). \tag{10}$$

Processor 520 down-converts $s_f(t)$ by mixing it respectively with $s_{mix\_i}(t)$ and $s_{mix\_q}(t)$, and low-pass filtering the outputs to a bandwidth of 4.75 Mhz, thereby producing in-phase baseband signal $s_i(t)$ and quadrature baseband signal $s_q(t)$ respectively. Processor 520 processes these signals to produce a baseband signal. For example, when the SNR (signal-to-noise-ratio) is high, the signals may be non-coherently combined to produce the base-band signal $$s_b(t)=\sqrt{s_i(t)^{2}+s_{q(t)}^{2}} \quad (11)$$

Figure 8:
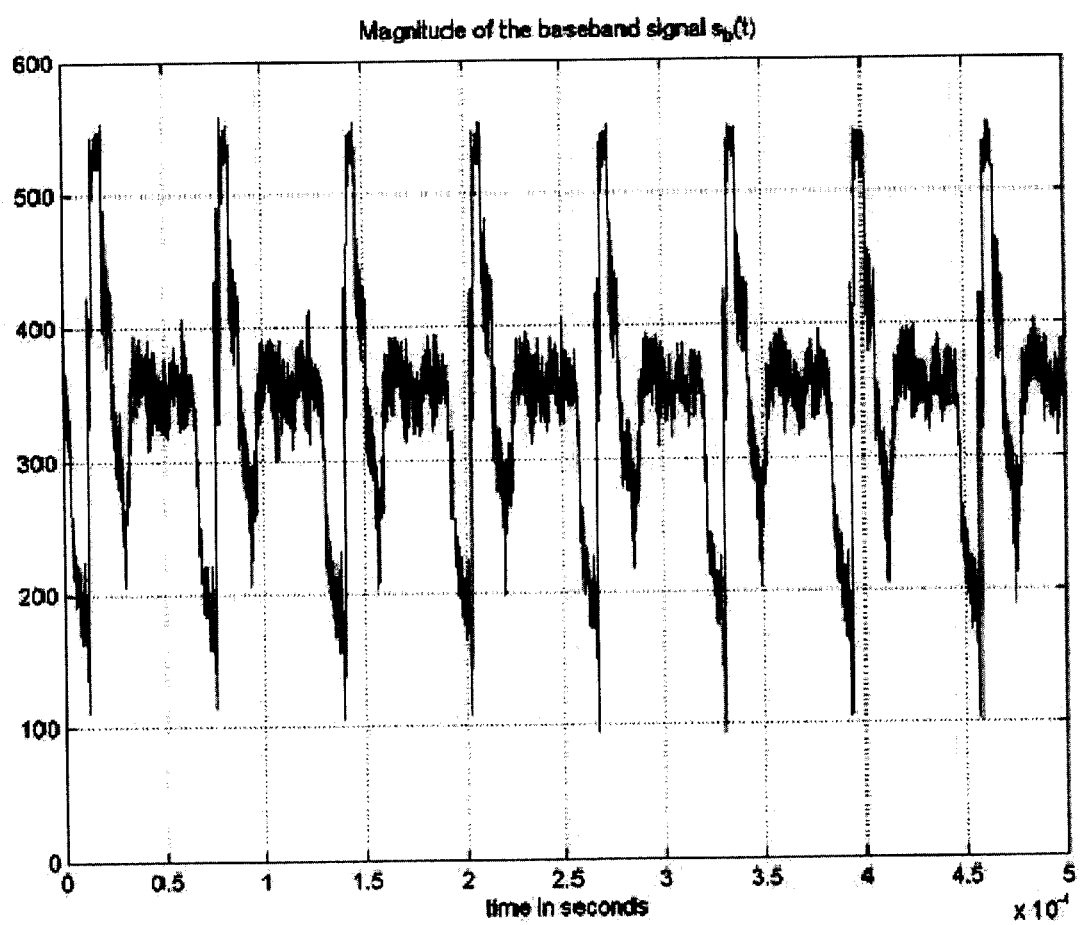
FIG. 8 shows a portion of the baseband signal according to one implementation.

The non-coherent combiner is robust to multipath, and very simple to implement, because it does not require that phase-lock be maintained on the incident signal. FIG. 8 shows a portion of the baseband signal $s_b(t)$ found according to this method. In low signal-to-noise ratio environments, a coherent down-conversion must be used to achieve better noise characteristics, as is well-known in the relevant art. The simplest approach to implementing a coherent down-conversion is to use a phase-locked loop, as is well-understood in the art. For example, assume that the phase-locked loop determines that a phase difference of $\Phi(t)$ exists between the incident signal $s_i(t)$ and the mixing signal $s_{mix\_i}(t)$. The baseband signal may then be found according to $$s_b(t)=(s_i(t)+js_q(t))\exp(-j\Phi(t)) \quad (12)$$

Note that this baseband signal is complex since we have preserved both the in-phase and quadrature signal components. The in-phase and quadrature signal components result from the vestigial sideband modulation scheme (VSB) which is used for analog television broadcasts, and is well-understood in the art. One possible simplification is to treat the signal as a double-sideband signal and simply use the real component, ignoring the energy in the quadrature component. In this case, the baseband signal is found according to $$s_b(t)=\text{real}[(s_i(t)+js_q(t))\exp(-j\Phi(t))] \quad (13)$$

Reformatting the Baseband Signal

For simplicity, in this section discusses the baseband signal computed according to equation (10). Extension to other baseband signals will be apparent to one skilled in the relevant art after reading this description. Processor 520 reformats the baseband signal (step 406). The timing signal to be tracked is repeated at the frequency of the blanking pulse, $\omega_H$=15.734 KHz, with a period H of 63.557 microseconds. For descriptive clarity, a segment of the signal $s_b(t)$ of duration H is referred to as a horizontal segment. In order to extract precise timing information from baseband signal $s_b(t)$, Processor 520 linearly combines multiple horizontal segments to form signals $s_1(t)$ and $s_2(t)$, each of duration H. Combining multiple segments enables one to substantially improve the power of the signal in comparison with the noise plus interference. In addition, by combining the signals in the manner described, one can efficiently isolate the chrominance carrier information from the horizontal synchronization information in order to achieve precise positioning.

Signal $s_1(t)$ is given by $$s_1(t) = \sum_{n=0,2,4...} s_b(t-nH) \quad (14)$$

Signal $s_2(t)$ is given by $$s_2(t) = \sum_{n=1,3,5...} s_b(t-nH) \quad (15)$$

Figure 9:
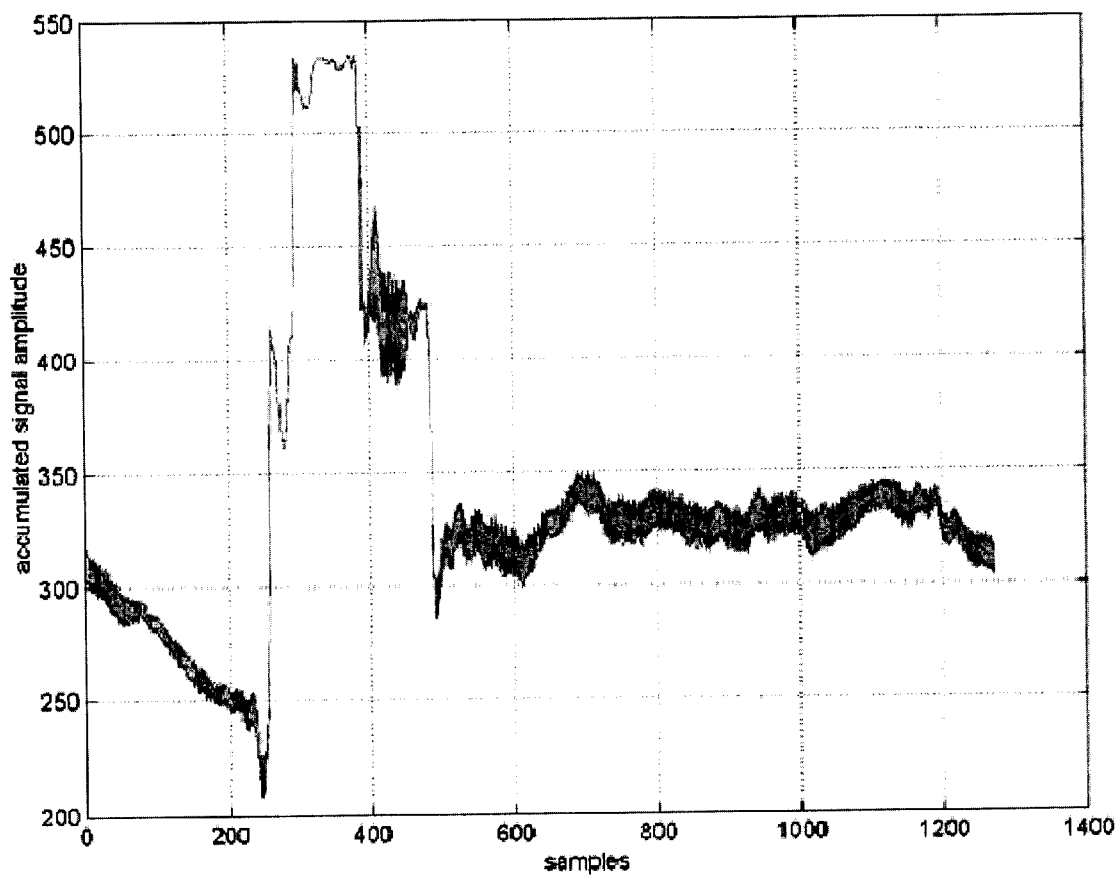
FIG. 9 shows the signals generated by taking a linear sum of even horizontal segments of the baseband signal, and a linear sum of odd horizontal segments of the baseband signal, plotted on top of one another.
Figure 10:
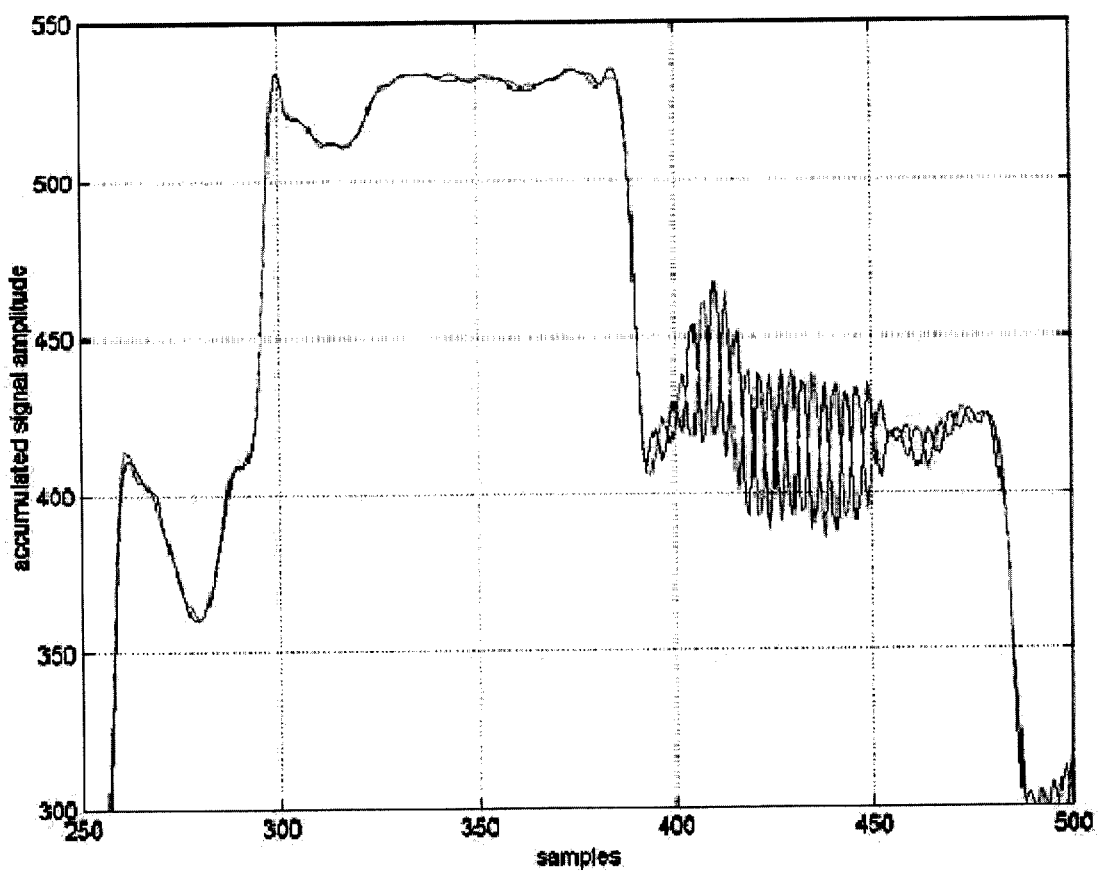
FIG. 10 shows an enlarged view of the horizontal blanking signal of FIG. 9.

Signal $s_1(t)$ consists of a linear sum of even horizontal segments. Signal $s_2(t)$ consists of a linear sum of odd horizontal segments. FIG. 9 shows the signals $s_1(t)$ and $s_2(t)$ plotted on top of one another. The burst of the chrominance sub-carrier signal on the back porch of the horizontal synchronization pulse is visible in FIG. 9. The chrominance carrier has frequency $\omega_c$=3.579 MHz and wavelength L of approximately equal to 27.9 microseconds. Wavelength L is generated from the same clock that generates the horizontal synchronization period H. The horizontal synchronization period H is not an integer multiple of L. However the ratio H/L=n+0.5 where n is some integer. Consequently, the burst of the chrominance sub-carrier signal on the back porch of the horizontal synchronization pulse for signal $s_1(t)$ is 180 degrees out of phase with the corresponding burst on signal $s_2(t)$. This is illustrated in FIG. 10, which shows an enlarged view of the horizontal blanking signal of FIG. 9.

Separating the Periodic Components from the Baseband Signal

Processor 520 next separates one or more of the periodic components from the baseband signal (step 408). In one implementation, the periodic component is the chrominance burst. In other implementations, the periodic component includes the horizontal blanking pulse, the horizontal synchronization pulse, other periodic components of the received analog TV signal, or combinations thereof. While the high frequency of the chrominance carrier signal generates precise range information, as is typical of carrier-phase positioning, this information is subject to a carrier cycle ambiguity. Thus it is necessary to resolve the cycle ambiguity in order to produce accurate position measurements. In various implementations, the information contained in the rising and falling edges of the horizontal blanking pulse and horizontal synchronization pulse is used to resolve the cycle ambiguity on the chrominance sub-carrier.

Figure 11:
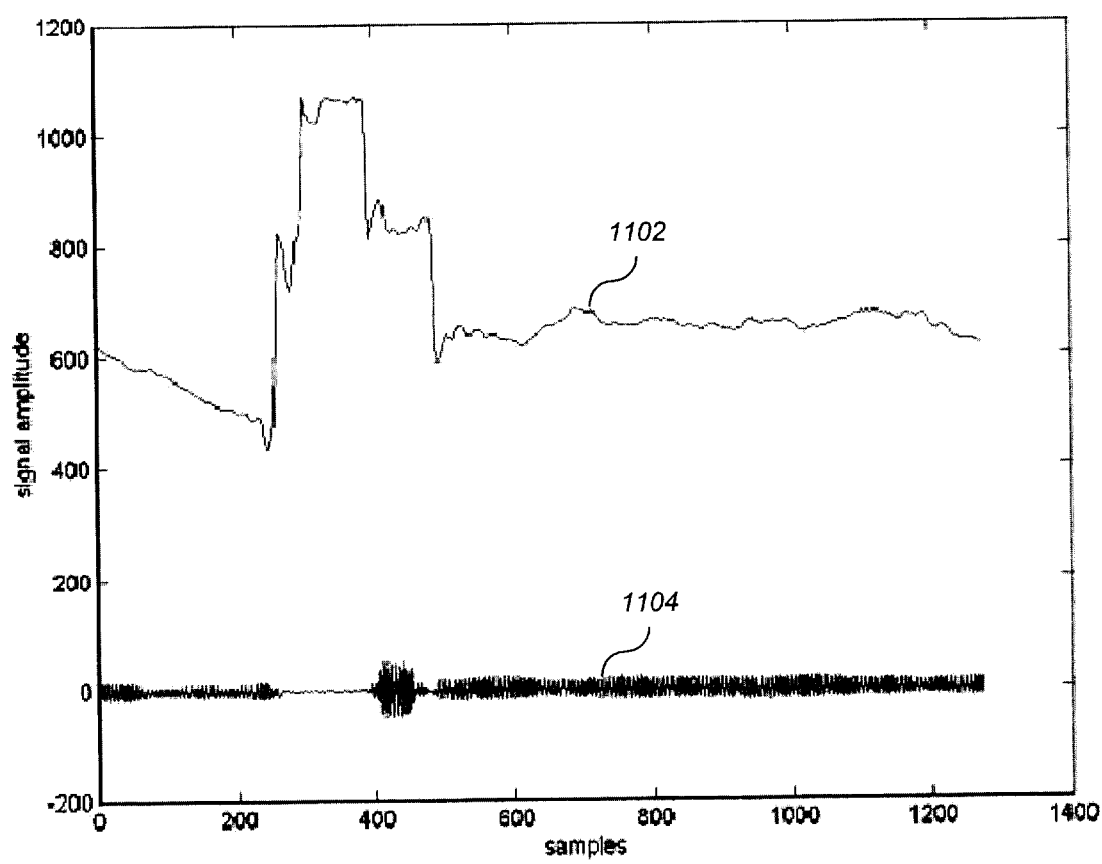
FIG. 11 shows a sum signal and a difference signal generated by taking the sum and difference of the odd and even segment signals.

In order to clearly render the information contained in the chrominance burst occurring on the back porch of the synchronization signal, processor 520 takes the sum and difference of the odd and even segment signals. FIG. 11 shows the sum signal 1102 and the difference signal 1104. The difference signal is constructed as $$s_{diff}=s_1(t)-s_2(t) \quad (16)$$

This process eliminates all of the non-ideal components in the analog signal, which are common from one horizontal segment to the next, while increasing the amplitude of the chrominance signal by a factor of two. The sum signal is constructed as $$s_{sum}=s_1(t)+s_2(t) \quad (17)$$

which eliminates the chrominance carrier information, but clearly renders the information from the horizontal synchronization pulse.

Figure 12:
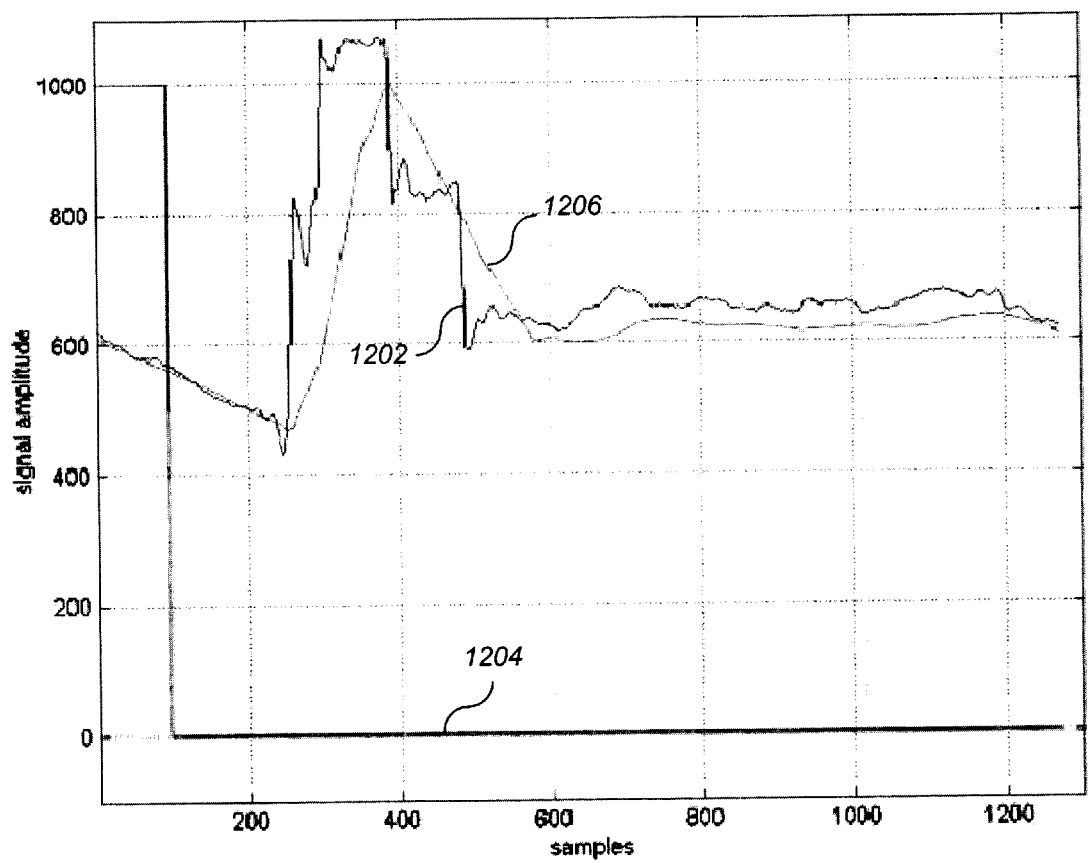
FIG. 12 shows the sum signal, a reference signal, and the correlation result for the signals.

Processor 520 also extracts timing information from the sum signal $s_{sum}(t)$ using a correlation technique which can work in very low signal-to-noise environments. Processor 520 correlates the sum signal $s_{sum}(t)$ with a reference signal $s_{synch\_ref}(t)$ to generate a correlation result $r_{synch}(\tau)$. FIG. 12 shows the sum signal 1202, the reference signal 1204, and the correlation result 1206. The reference signal is designed to match the horizontal synchronization pulse, which is always of higher amplitude than the maximum possible amplitude of the luminescence signal. In one implementation, this correlation is performed by a software receiver that uses Fourier and Inverse Fourier transforms according to $$r_{synch}(\tau) = \mathit{ifft}(\mathit{fft}(s_{synch\_ref}(t))\mathit{fft}(s_{sum}(t))) \tag{18}$$

where fft( ) denotes a fast Fourier transform and ifft( ) denotes an inverse fast Fourier transform. In one implementation, a coarse pseudorange is obtained from the correlation peak shown in $r_{synch}(\tau)$. However, this pseudorange is subject to imprecision in the fine structure of the horizontal synchronization pulse. For example, according to the NTSC specification, the width of the horizontal synchronization pulse can vary by up to 1 microsecond. Further, the correlation peak may be somewhat rounded, making it difficult to obtain a precise measurement of the peak. In one implementation, the rising edge of the correlation peak is measured instead at a predetermined threshold that can be set as some percentage (for example, 90%) of the peak correlation result amplitude.

Figure 13:
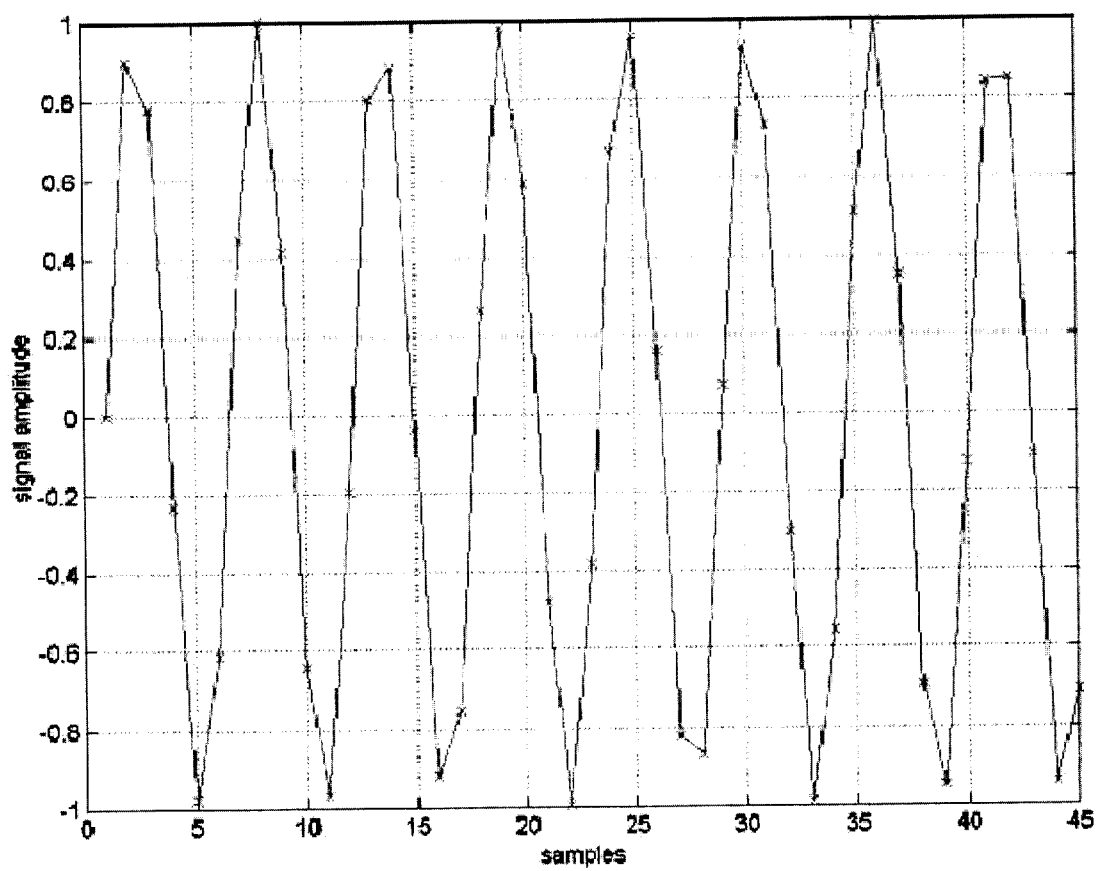
FIG. 13 shows a correlation reference signal for the chrominance burst.
Figure 14:
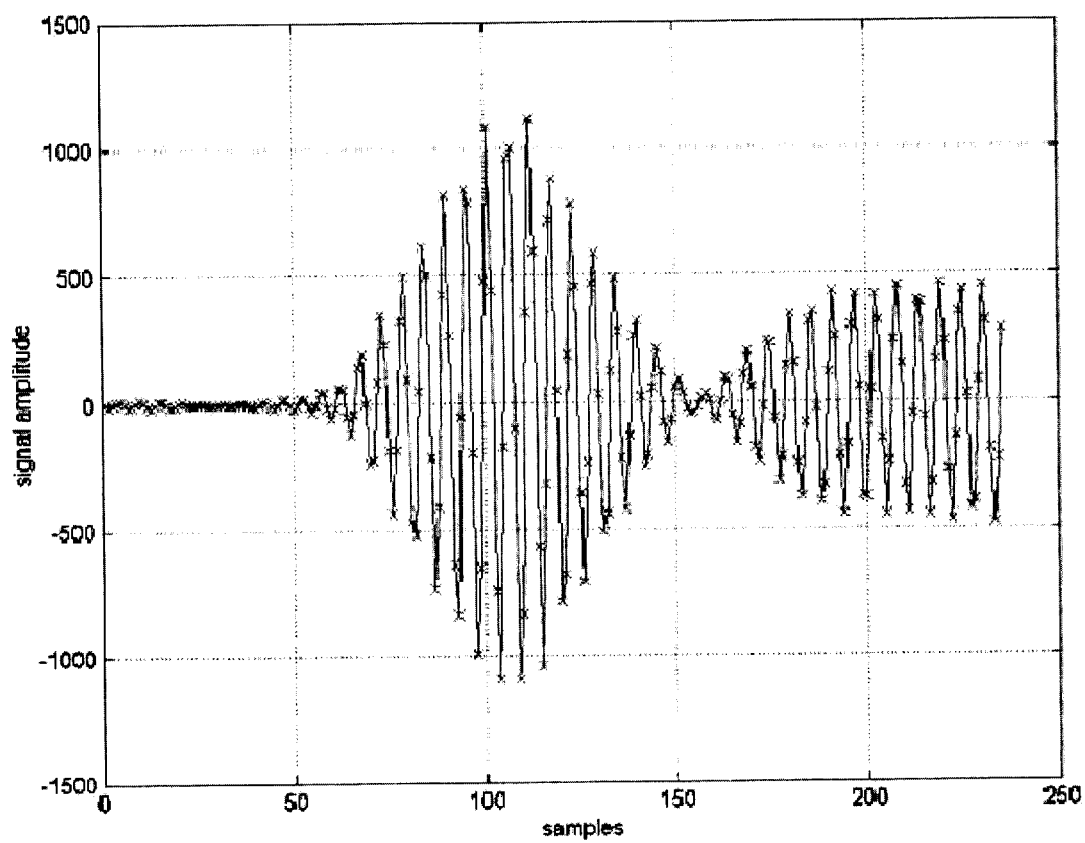
FIG. 14 shows the result of the correlation between the chrominance burst and its correlation reference signal.

Processor 520 now extracts the portion of the difference signal $s_{diff}(t)$ that contains the chrominance carrier burst by correlating the difference signal with a reference signal $s_{chrom\_ref}(t)$ that assumes the there are exactly 8 wavelengths of the chrominance carrier in the burst. Implementations using number of wavelengths other than 8 will be apparent to one skilled in the relevant art after reading this description. FIG. 13 shows the correlation reference signal $s_{chrom\_ref}(t)$ for the chrominance burst. FIG. 14 shows the result of the correlation $r_{chrom}(\tau)$. The correlation result has a triangular envelope due to the limited duration of the chrominance burst. However, the envelope shape is not sufficiently precise to resolve carrier cycle ambiguity, particularly in the presence of multipath. Consequently, processor 520 does not attempt to resolve the cycle ambiguity from this data. Rather, processor 520 simply identifies the location $\tau_{chrom\_peak}$ of the peak value in $r_{chrom}(\tau)$, and determines the transition point $\tau_{chrom\_trans}$ trans of the first zero crossing of the waveform moving backwards from the point $\tau_{chrom\_peak}$ (that is, to the left of the peak value, referring to FIG. 14). Using linear interpolation, the transition point $\tau_{chrom\_trans}$ can be identified to fractions of a sample. For example, for the correlation result $r_{chrom}(\tau)$ shown in FIG. 14, $\tau_{chrom\_trans}$=110.69 samples or 5.5349 microseconds. This transition point can be used to determine an effective pseudorange $p_{chrom}$ measured relative to the start of the horizontal segment. In the example of FIG. 14, $p_{chrom}$=407.69 samples=20.3849 microseconds, measured from the start of the first horizontal segment sampled.

Parameterizing the Periodic Components

In one implementation, processor 520 generates parameters that characterize the periodic components of the broadcast analog TV signal (step 410).

Horizontal Synchronization Signal Parameters

In one implementation, user terminal 102 obtains a rough pseudorange by correlating received TV signals with a correlation reference signal. Accordingly, processor 520 generates parameters for transmission to user terminal 102, which constructs the correlation reference signal based on the parameters, as described below.

In some implementations, the parameters include parameters describing the reference signal $s_{synch\_ref}(t)$, shown in FIG. 12 as reference signal 1204. These parameters can include, for example, the width of the pulse of signal $s_{synch\_ref}(t)$. In other implementations these parameters are known in advance and stored within user terminal 102.

Chrominance Burst Parameters

In one implementation, user terminal 102 obtains a pseudorange by correlating received TV signals with a reference signal based on the chrominance burst. Processor 520 generates parameters that user terminal 102 uses to resolve the cycle ambiguity in the chrominance burst.

In some implementations, the parameters include parameters describing the correlation reference signal $s_{synch\_ref}(t)$ for the chrominance burst, shown in FIG. 13. These parameters can include, for example, integers describing the breakpoints in signal $s_{sum\_deriv}(t)$. In other implementations these parameters are known in advance and stored within user terminal 102.

In one implementation, the cycle ambiguity in the chrominance burst is resolved using the coarse pseudorange obtained from the correlation peak in $r_{synch}(\tau)$. In another implementation, the cycle ambiguity is resolved using information from the derivatives of one or both of the horizontal blanking and synchronization pulses. Techniques for obtaining this information are now described.

Derivative Parameters

In general, an optimal correlation for capturing signal timing information is achieved by correlating a signal with its derivative as the reference signal, and locating the zero crossing of the correlation result, as is well-known in the relevant arts. In one implementation, processor 520 replicates this theoretically optimal approach by characterizing the derivative of sum signal $s_{sum}(t)$. That derivative is referred to herein as $s_{sum\_deriv}(t)$. Because the duration of the horizontal synchronization pulse and the horizontal blanking pulse may vary over 1 and 2 microseconds respectively, processor characterizes this signal. In addition, processor 520 parameterizes the derivative (that is, generates parameters that characterize the derivative) and conveys those parameters to user terminal 102, which is unable to perform such precise measurements of the signal, but requires an accurate reference signal to correlate with the TV signals it receives.

Figure 15:
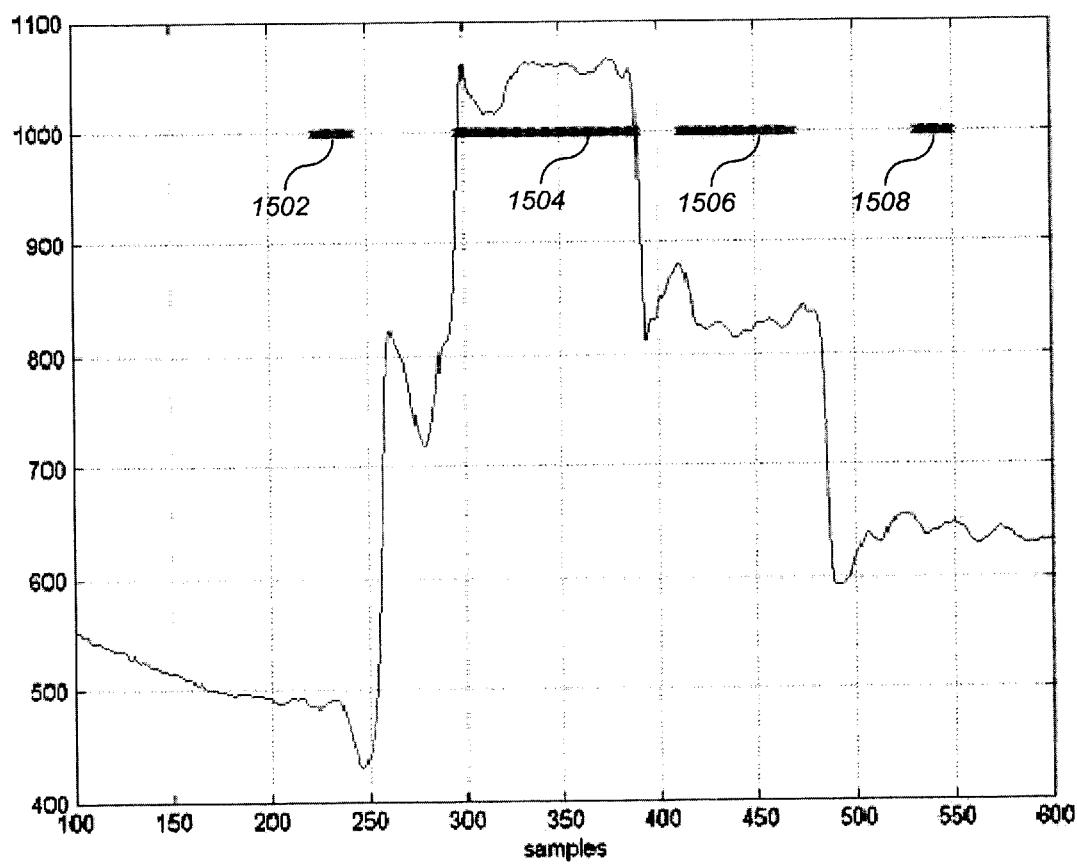
FIG. 15 shows the samples used to estimate the average value of the sum signal at certain predetermined locations.

Processor 520 begins by estimating the average value of the signal $s_{sum}(t)$ at certain predetermined locations. FIG. 15 indicates the samples used with horizontal bars. Each bar indicates the samples that are averaged to obtain an average value of the samples for that portion of the signal. These locations include the portion 1502 of the signal preceding the horizontal blanking pulse, the top 1504 of the synchronization pulse, the back porch 1506 of the synchronization pulse, and the portion 1508 of the signal following the horizontal blanking pulse. This is useful because the magnitude of the signal preceding/following the horizontal blanking pulse will vary.

Processor 520 uses these average values, not to precisely determine the average magnitude of each portion of the signal, but rather to determine the location of the rising and falling edges of the horizontal synchronization and blanking pulses. For each edge, processor 520 generates a threshold such that the location of the leading or rising edges are identified based on where the signal crosses that threshold. The threshold is chosen so that the technique is robust to varying luminescence levels preceding and following the horizontal blanking pulse. In one implementation, the threshold is selected to be mid-point of the shorter between the rising and the falling edge of the blanking pulse. Various implementations use only the rising and falling edges of the horizontal synchronization pulse, only those of the horizontal blanking pulse, or both.

Figure 16:
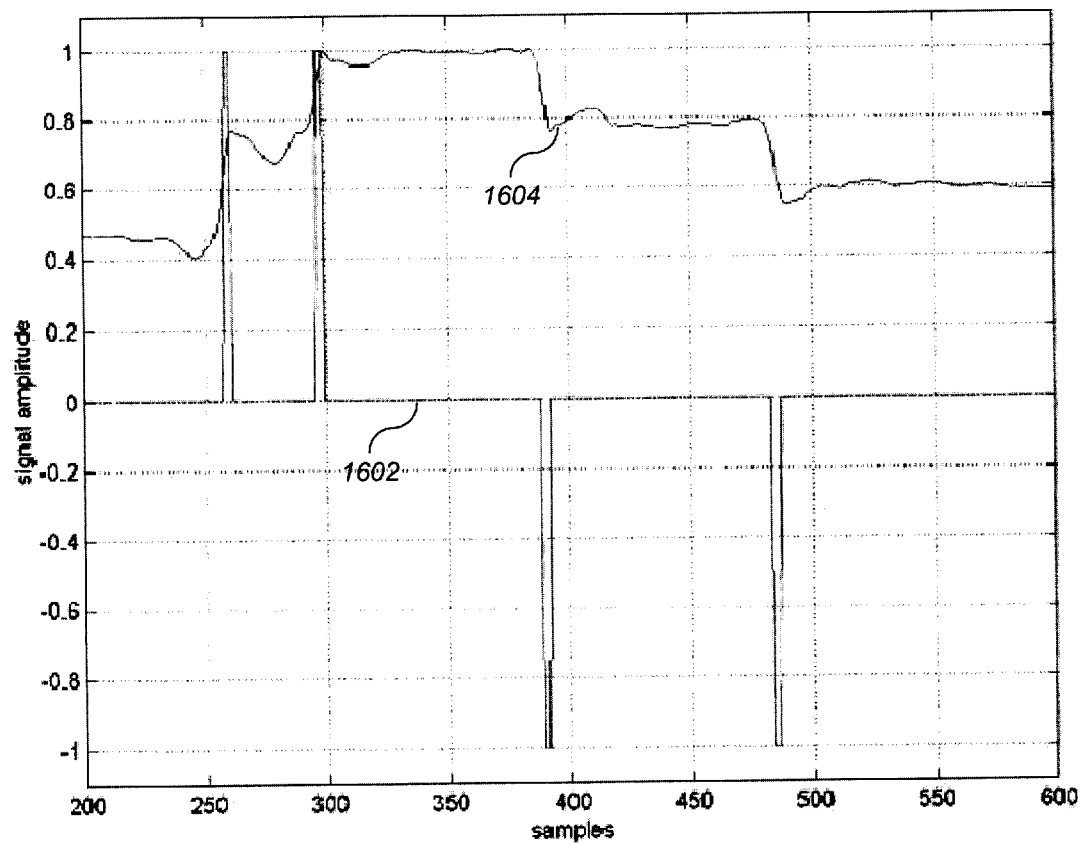
FIG. 16 shows an approximation to the derivative of the sum signal on the same axes as a normalized replica of the sum signal.

FIG. 16 shows the resulting approximation 1602 to $s_{sum\_deriv}(t)$ on the same axes as a normalized replica 1604 of $s_{sum}(t)$. In the signal shown in FIG. 16, each pulse of waveform $s_{sum\_deriv}(t)$ is implemented with 3 points. If the pulse widths are known a priori, the entire waveform $s_{sum\_deriv}(t)$ can be characterized by 4 integers that specify the mid-point of each pulse. In one implementation, these parameters are sent to user terminal 102. According to that implementation, user terminal 102 constructs a reference signal based on the parameters, and correlates the reference signal with a received TV signal to generate one or more pseudoranges.

Figure 17:
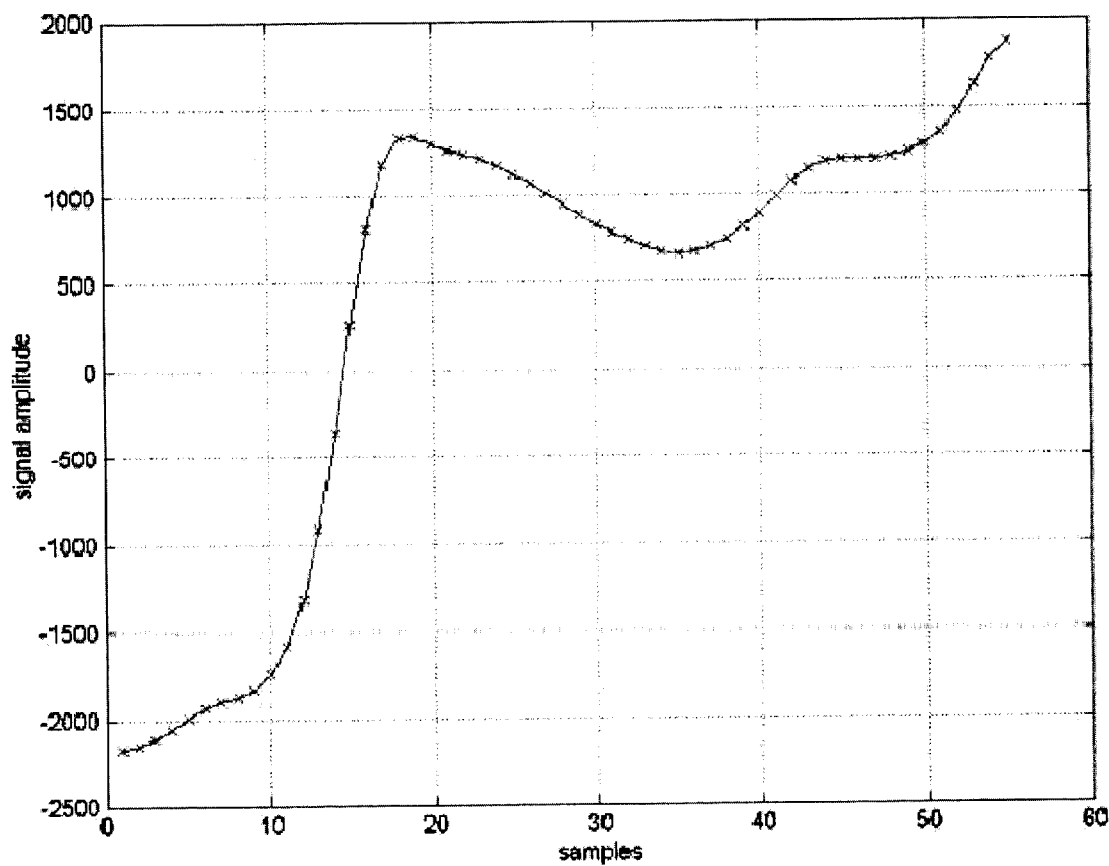
FIG. 17 shows the correlation result for the sum signal and the approximation of the derivative of the sum signal.

Processor 520 correlates the derivative approximation $s_{sum\_deriv}(t)$ with the sum signal $s_{sum}(t)$ to produce a correlation result $r_{dif}(\tau)$. The correlation result is shown in FIG. 17. Processor 520 performs the correlation only over a limited subsection of $s_{sum}(t)$ based on the coarse timing information extracted previously. The point of transition of the correlation result $r_{synch}(\tau)$ is determined by linear interpolation. For the example of FIG. 17, the point of transition $\tau_{deriv}$ is roughly 14.58 samples=0.72908 microseconds. Projecting this measurement relative to the start of the horizontal segment yields a pseudorange $p_{deriv}$=257.58 samples 12.87908 microseconds.

Processor 520 computes the difference between the two pseudorange measurements taken to obtain a delta signal $$\Delta p = p_{chrom} - P_{deriv} s_{mix\_q}(t) = \sin(\omega_v t) \qquad (19)$$

The delta signal $\Delta p$ can be used to resolve the cycle ambiguity for the user. In one implementation, five parameters are sent to user terminal 102, namely $\Delta p$, together with the four integers which characterize the signal $s_{sum\_deriv}(t)$. In one implementation, only the horizontal synchronization pulse rising and falling edges are used, thus requiring only the two integers that specify the location of the rising and falling edges.

Monitor unit 108 transmits parameters to user terminal 102 (step 412), which employs the parameters to generate one or more pseudoranges, as described below.

In some implementations, the parameters include parameters describing the signal $s_{sum\_deriv}(t)$, shown in FIG. 16 as reference signal 1602. These parameters can include, for example, integers describing the width and location of the pulses in signal $s_{sum\_deriv}(t)$. In other implementations these parameters are known in advance and stored within user terminal 102.

Generating a Pseudorange at the User Terminal

Figure 18:
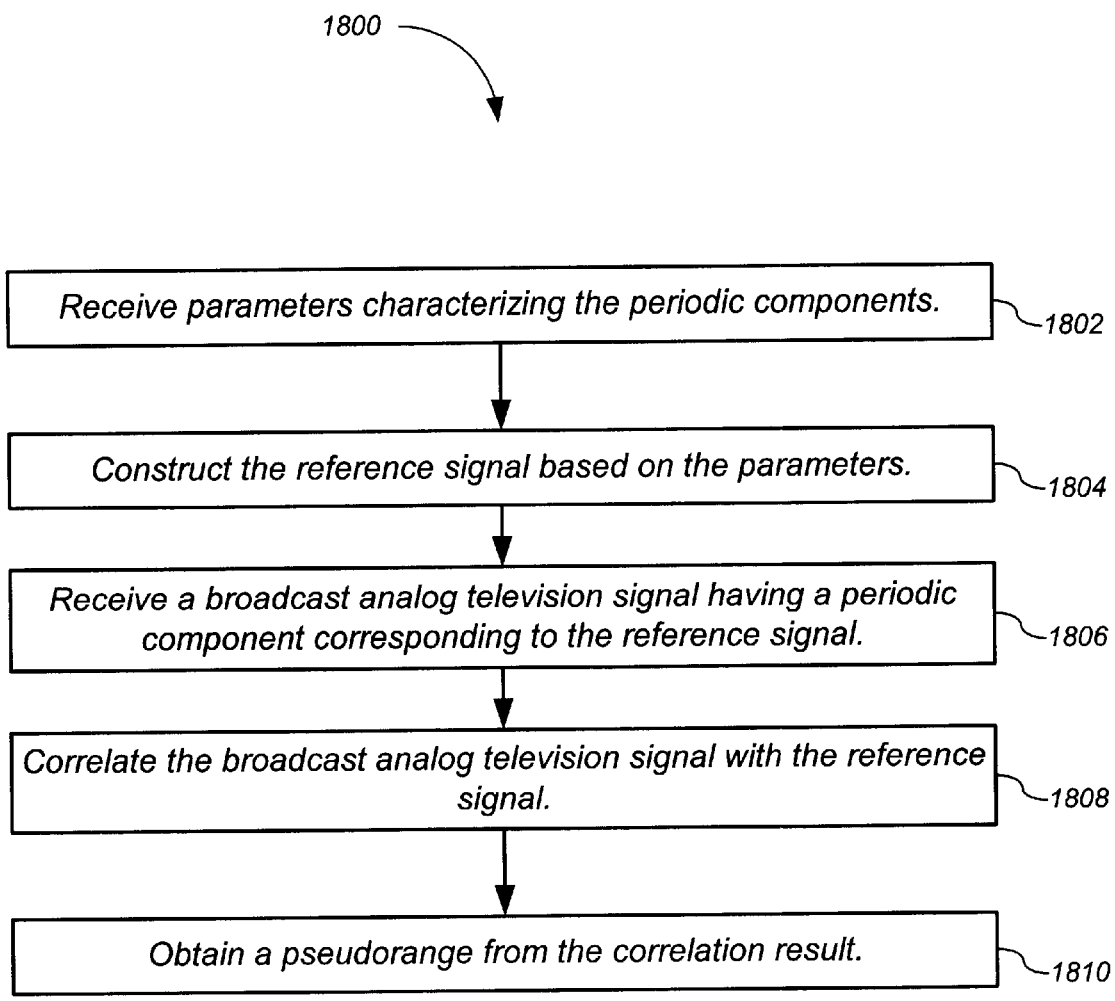
FIG. 18 shows a process performed by a user terminal according to one implementation.

FIG. 18 shows a process 1800 performed by a user terminal 102 according to one implementation. User terminal 102 includes a receiver similar to that discussed with respect to FIG. 5. User terminal 102 receives parameters characterizing the periodic components of the TV signals (step 1802). These parameters are generated by monitor units 108, as described in detail above. For each periodic component to be measured, user terminal 102 constructs a reference signal based on the received parameters (step 1804). The periodic components can include the horizontal synchronization pulse, the horizontal blanking pulse, and the chrominance burst, or any combination thereof. For the horizontal blanking pulse, user terminal 102 constructs the reference signal $s_{synch\_ref}(t)$ shown as signal 1204 in FIG. 12. For the chrominance burst, user terminal 102 constructs the reference signal shown in FIG. 13. For the horizontal synchronization pulse and the horizontal blanking pulse user terminal 102 constructs reference signal 1602 shown in FIG. 16. Of course, reference signal 1602 can be modified to describe only one of the horizontal synchronization pulse and the horizontal blanking pulse, as would be apparent to one skilled in the relevant arts after reading this description.

User terminal 102 receives broadcast analog TV signals (step 1806) and correlates the received TV signals with the reference signals. User terminal 102 obtains a pseudorange from each correlation result (step 1810). The pseudoranges and the locations of the TV transmitters are used to determine the location of the user terminal, as described in detail above.

Figure 19:
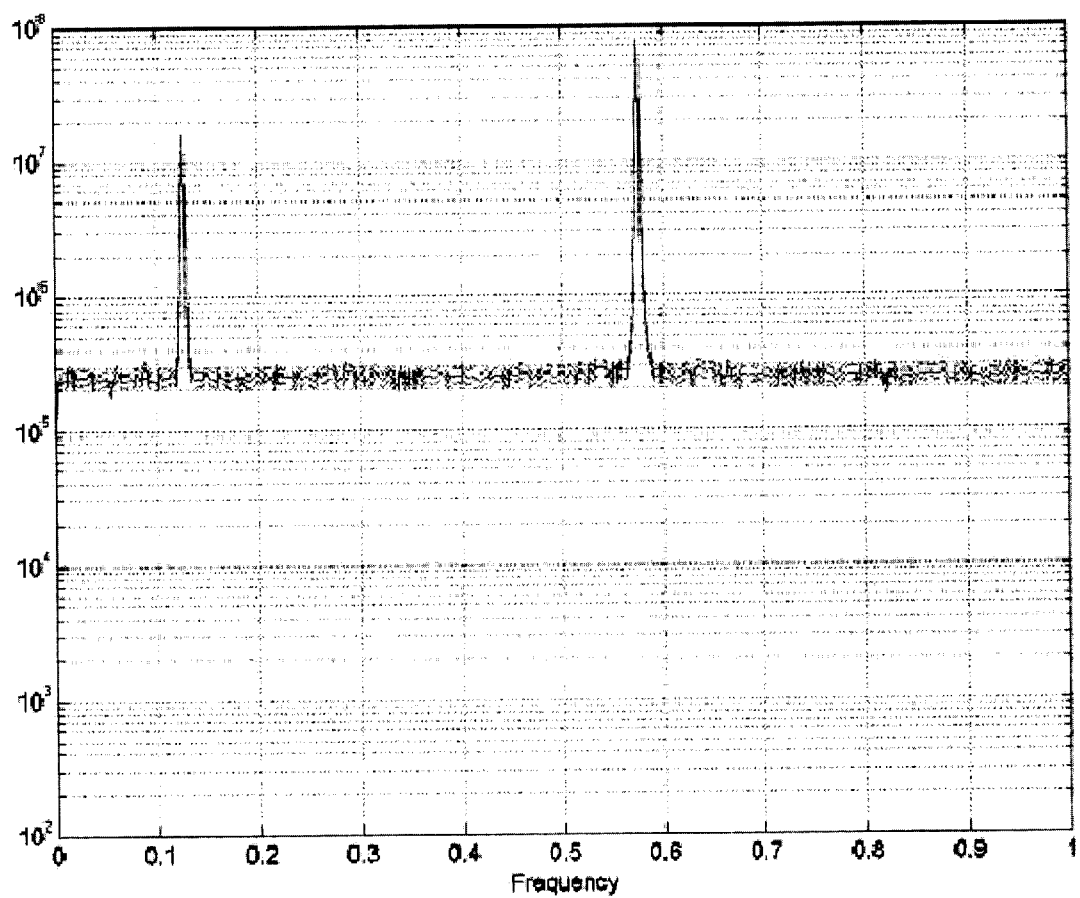
FIG. 19 shows the spectrum for a severely attenuated TV signal.

The TV signals received by user terminal 102 may be severely attenuated. FIG. 19 shows the spectrum for such a signal where an attenuation such that the signal-to-noise ratio is 0 dB is simulated by adding zero-mean white Gaussian noise to the signal shown in FIG. 6.

Figure 20:
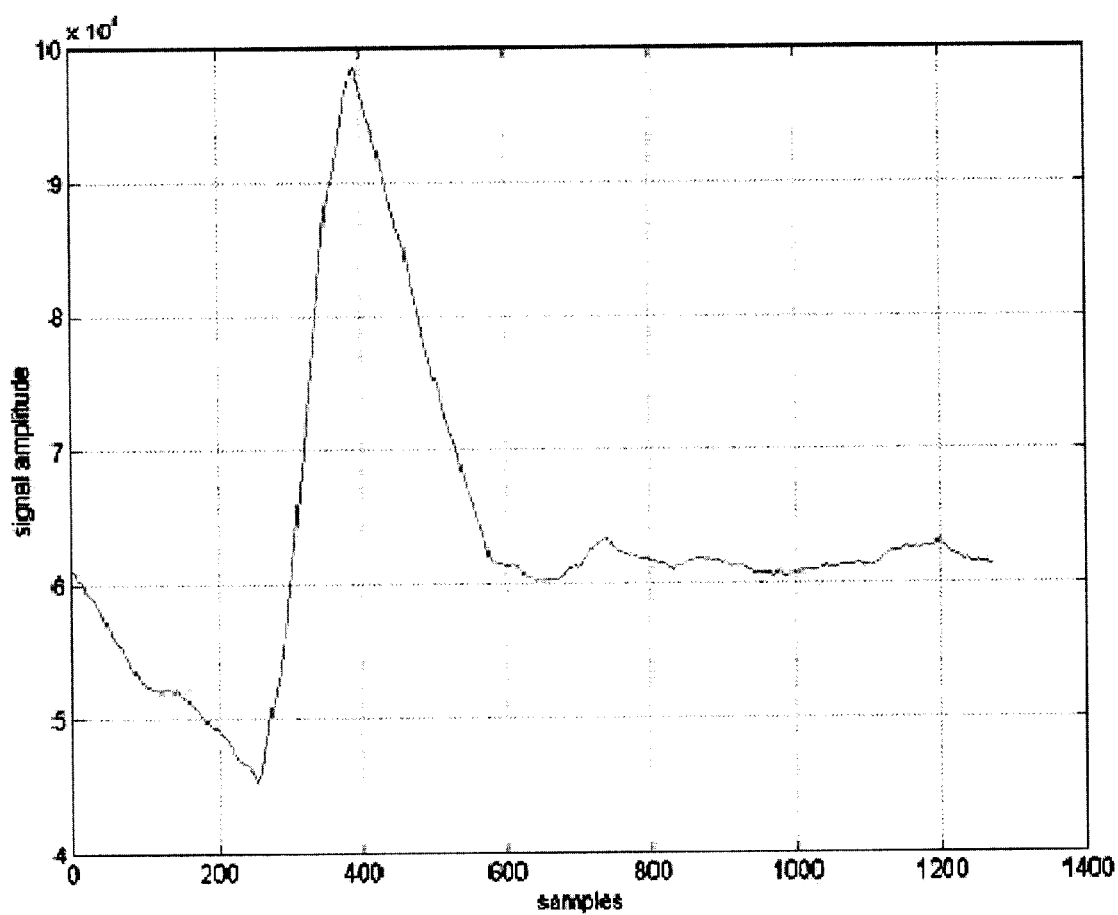
FIG. 20 shows the result of the correlation between the sum signal and a reference signal at a user terminal.

FIG. 20 shows the result of the correlation between the user signal $s_{sum\_user}(t)$ and the reference signal $s_{synch\_ref}(t)$. Only 13 milliseconds of data were used to generate $s_{sum\_user}(t)$ for this plot. Although the timing information is not precise, the correlation peak is clear, and the signal could be attenuated further while still enabling a timing signal to be extracted.

Figure 21:
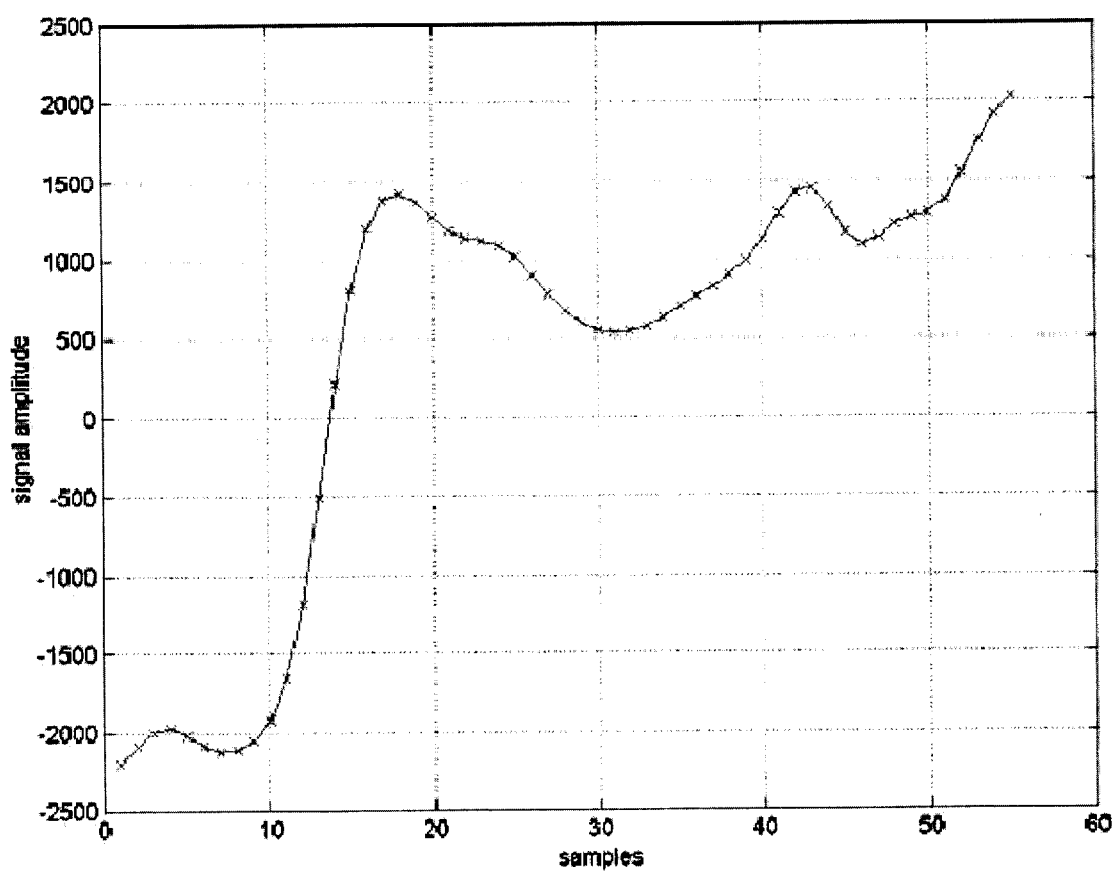
FIG. 21 shows the correlation result for the sum signal and the replica of the derivative of the sum signal at a user terminal.
Figure 22:
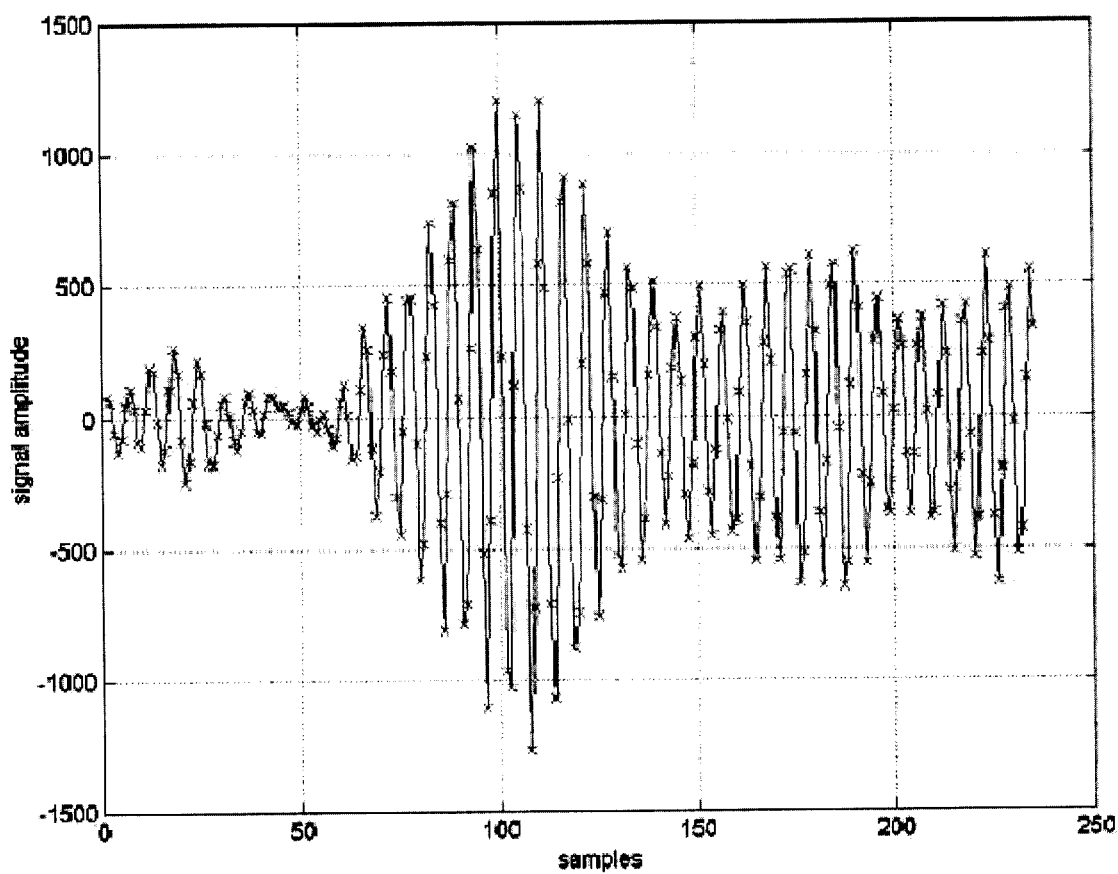
FIG. 22 shows the result of the correlation between the chrominance burst and its correlation reference signal at a user terminal.

FIG. 21 shows the result of the correlation between the user signal $s_{dif\_user}(t)$ with the reference signal $s_{chrom\_ref}(t)$. Again 13 milliseconds of data were used. FIG. 22 shows the result of the correlation between the user signal $s_{sum\_user}(t)$ and the reference signal $s_{dif}(t)$.

Applying the techniques describe above to the respective correlation functions for the simulated user signal produces pseudoranges $p_{chrom\_user}$=396.32 samples and $p_{deriv\_user}$= 257.71 samples, respectively. The integer cycle ambiguity in $p_{deriv\_user}$ is resolved by finding that integer number N that minimizes $$|p_{chrom\_user} - p_{dif\_user} - \Delta p - NL|s_{mix\_q}(t) = \sin(\omega_v t) \qquad (20)$$

For the example above, N is −2, so the corrected pseudorange is 407.49 samples.

The user and reference pseudoranges are then processed to determine a position for the user terminal, as described above. This includes resolving the phase ambiguity introduced by the horizontal synchronization pulse period H.

Other Broadcast Analog TV Formats

With minor variations which will be apparent to one skilled in the relevant art, the techniques described above can be applied to all of the primary analog television standards around the world. For the sake of clarity, the differences between these standards and the required modifications to these techniques are briefly described. The three primary standards are NTSC, PAL (Phase Alternation Line), and SECAM (Sequential Coulier Avec Memoire). Some of the fundamental specifications for NTSC, PAL and SECAM are described in Table 1.

TABLE 1

|  | NTSC | PAL | SECAM |
|---|---|---|---|
| Lines/Field | 525/60 | 625/50 | 625/50 |
| Horizontal Line Rate | 15734 Hz | 15625 Hz | 15625 Hz |
| Vertical Field Rate | 59.94 Hz | 50.0 Hz | 50.0 Hz |
| Chrominance Carrier | 3.579545 MHz | 4.433618 MHz | Above |
| Video Bandwidth | 4.2 MHz | 5.5 MHz | 5.0 MHz |
| Audio Carrier | 4.5 MHz | 6.0 MHz | 5.5 MHz |
| Channel Bandwidth | 6 MHz | 8 MHz | 7 & 8 MHz (B&R) |

TABLE 1-continued

| | NTSC | PAL | SECAM |
|---|---|---|---|
| Blanking Setup (Front Porch) | 7.5 IRE | 0.0 IRE | 0.0 IRE |

While the values of the specifications differ, the basic technique applied to the horizontal synchronization pulses described above can be similarly applied in all cases. This is not true of the technique employed to extract timing from the chrominance carrier signal.

The color encoding scheme for PAL is similar to that of NTSC. However, one notable difference is that the carrier frequency is related to the horizontal synchronization frequency, $\omega_H$, and vertical synchronization frequency, $\omega_V$, by the formula $$\omega_c = \frac{1135}{4}\omega_H + \frac{1}{2}\omega_V \qquad (21)$$

where $\omega_V$=50 Hz. Consequently, the phase is roughly repeated every 4 horizontal segments. In order to implement the combining technique discussed above, a digital phase rotation can be implemented, as will be apparent to one skilled in the relevant art after reading this description.

The color scheme for SECAM differs considerably from NTSC in the way in which the color information is modulated onto the chrominance carriers. As it relates to the techniques disclosed herein, the primary difference is that two different sub-carriers are used to communicate the color information, each dedicated to different components of the color spectrum. They are related to the horizontal synchronization frequency by $\omega_{c\_1}=272\omega_H$ and $\omega_{c\_1}=282\omega_H$ respectively. Chrominance carriers $\omega_{c\_1}$ and $\omega_{c\_2}$ are transmitted alternately from one horizontal segment to the next. The burst on the blanking pulse can still be used for timing information; however a digital phase rotation would be necessary in order to employ a combining scheme similar to that described above.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. For example, one might use only the rising and falling edges of the horizontal synchronization pulse, and ignore the rising and falling edges of the blanking pulse. This is perhaps necessary for those standards (PAL and SECAM) where there is no blanking setup. As another possible variation, one could use only the correlation outputs $r_{dif}(\tau)$ and $r_{dif\_user}(\tau)$ for positioning, without using information derived from the chrominance burst. This would of course be subject to variations in the timing of the horizontal synchronization pulse and blanking pulse, but these accuracy variations may be below the noise floor determined by multipath. In addition, many different techniques exist for structuring the reference signal $s_{dif}(t)$ or a signal with similar functionality, and parameterizing it for communication to the user. Another variation is to implement a non-coherent detection scheme, however, to perform a correlation with the relevant reference signals before performing the envelope detection. This will considerably enhance the performance at low SNR, while still not requiring a phase-locked loop. This method will be well understood to one skilled in the art after reading this disclosure. Furthermore, it is possible that when an analog television station switches from one video clip to another, the timing on the horizontal synchronization pulse, and chrominance carrier signal, will experience discontinuities. In this case, the monitor stations keep track of the clock offset of the analog channel in near real-time so that these discontinuities can be accommodated in computing differential position. Accordingly, other implementations are within the scope of the following claims.

What is claimed is:

1. A method for determining the position of a user terminal, comprising:
   receiving, at the user terminal, a broadcast analog television signal having a periodic component; and
   correlating the broadcast analog television signal with a predetermined reference signal based on the periodic component, thereby producing a pseudorange; and wherein
   the location of the user terminal is determined based on the pseudorange and a location of the transmitter of the broadcast analog television signal.

2. The method of claim 1, further comprising:
   determining the location of the user terminal based on the pseudorange and the location of the transmitter of the broadcast analog television signal.

3. The method of claim 1, further comprising:
   receiving parameters describing the predetermined reference signal; and
   generating the predetermined reference signal based on the parameters.

4. The method of claim 1, wherein the periodic component is a horizontal synchronization pulse.

5. The method of claim 4, further comprising:
   identifying the peak of the result of the correlating, thereby producing the pseudorange.

6. The method of claim 1, further comprising:

receiving parameters describing the derivative of the periodic component;

generating the predetermined reference signal based on the parameters; and identifying the first zero crossing of the result of the correlating, thereby producing the pseudorange.

7. The method of claim 6, wherein the periodic component is selected from the group comprising:

a horizontal synchronization pulse;

a horizontal blanking pulse; and a horizontal blanking pulse and a horizontal synchronization pulse.

8. The method of claim 7, further comprising:

correlating the broadcast analog television signal with a second predetermined reference signal, the second predetermined reference signal based on the horizontal synchronization pulse, thereby producing a second correlation result;

identifying the peak of the second correlation result, thereby producing a second pseudorange; and producing a refined pseudorange based on the pseudorange and the second pseudorange; and wherein the position of the user terminal is determined based on the refined pseudorange and the location of the transmitter of the broadcast analog television signal.

9. The method of claim 1, wherein the periodic component is a chrominance burst, further comprising:

resolving ambiguity in the pseudorange resulting from cycle ambiguity in the chrominance burst.

10. The method of claim 1, further comprising:

correlating the broadcast analog television signal with a second predetermined reference signal, the second predetermined reference signal based on the horizontal synchronization pulse, thereby producing a second correlation result;

producing a second pseudorange based on the second correlation result; and producing a refined pseudorange based on the pseudorange and the second pseudorange; and wherein the position of the user terminal is determined based on the refined pseudorange and the location of the transmitter of the broadcast analog television signal.

11. The method of claim 10, further comprising:

receiving parameters describing the derivative of a second periodic component;

generating the predetermined reference signal based on the parameters; and identifying the first zero crossing of the result of the correlating, thereby producing the pseudorange; and wherein the second periodic component is selected from the group comprising:

a horizontal synchronization pulse, a horizontal blanking pulse, and a horizontal blanking pulse and a horizontal synchronization pulse.

12. The method of claim 1, wherein the position of the user terminal is determined by adjusting the pseudoranges based on a difference between a transmitter clock at the transmitter of the broadcast analog television signal and a known time reference, and determining the position of the user terminal based on the adjusted pseudorange and the location of the TV transmitter.

13. The method of claim 1, further comprising:

determining a further pseudorange based on a further broadcast analog television signal; and projecting the pseudorange and the further pseudorange to an instant of time, thereby eliminating any first order term in the clock of the user terminal.

14. An apparatus for determining the position of a user terminal, comprising:

means for receiving, at the user terminal, a broadcast analog television signal having a periodic component; and means for correlating the broadcast analog television signal with a predetermined reference signal based on the periodic component, thereby producing a pseudorange; and wherein the location of the user terminal is determined based on the pseudorange and a location of the transmitter of the broadcast analog television signal.

15. The apparatus of claim 14, further comprising:

means for determining the location of the user terminal based on the pseudorange and the location of the transmitter of the broadcast analog television signal.

16. The apparatus of claim 14, further comprising:

means for receiving parameters describing the predetermined reference signal; and means for generating the predetermined reference signal based on the parameters.

17. The apparatus of claim 14, wherein the periodic component is a horizontal synchronization pulse.

18. The apparatus of claim 17, further comprising:

means for identifying the peak of the result of the correlating, thereby producing the pseudorange.

19. The apparatus of claim 14, further comprising:

means for receiving parameters describing the derivative of the periodic component;

means for generating the predetermined reference signal based on the parameters; and means for identifying the first zero crossing of the result of the correlating, thereby producing the pseudorange.

20. The apparatus of claim 19, wherein the periodic component is selected from the group comprising:

a horizontal synchronization pulse;

a horizontal blanking pulse; and a horizontal blanking pulse and a horizontal synchronization pulse.

21. The apparatus of claim 20, further comprising:

means for correlating the broadcast analog television signal with a second predetermined reference signal, the second predetermined reference signal based on the horizontal synchronization pulse, thereby producing a second correlation result;

means for identifying the peak of the second correlation result, thereby producing a second pseudorange; and means for producing a refined pseudorange based on the pseudorange and the second pseudorange; and wherein the position of the user terminal is determined based on the refined pseudorange and the location of the transmitter of the broadcast analog television signal.

22. The apparatus of claim 14, wherein the periodic component is a chrominance burst, further comprising:

means for resolving ambiguity in the pseudorange resulting from cycle ambiguity in the chrominance burst.

23. The apparatus of claim 14, further comprising:
means for correlating the broadcast analog television signal with a second predetermined reference signal, the second predetermined reference signal based on the horizontal synchronization pulse, thereby producing a second correlation result;
means for producing a second pseudorange based on the second correlation result; and
means for producing a refined pseudorange based on the pseudorange and the second pseudorange; and wherein
the position of the user terminal is determined based on the refined pseudorange and the location of the transmitter of the broadcast analog television signal.

24. The apparatus of claim 23, further comprising:
means for receiving parameters describing the derivative of a second periodic component;
means for generating the predetermined reference signal based on the parameters; and
means for identifying the first zero crossing of the result of the correlating, thereby producing the pseudorange; and wherein
the second periodic component is selected from the group comprising:
a horizontal synchronization pulse,
a horizontal blanking pulse, and
a horizontal blanking pulse and a horizontal synchronization pulse.

25. The apparatus of claim 14, wherein the position of the user terminal is determined by adjusting the pseudoranges based on a difference between a transmitter clock at the transmitter of the broadcast analog television signal and a known time reference, and determining the position of the user terminal based on the adjusted pseudorange and the location of the TV transmitter.

26. The apparatus of claim 14, further comprising:
means for determining a further pseudorange based on a further broadcast analog television signal; and
means for projecting the pseudorange and the further pseudorange to an instant of time, thereby eliminating any first order term in the clock of the user terminal.

27. An apparatus for determining the position of a user terminal, comprising:
a receiver to receive, at the user terminal, a broadcast analog television signal having a periodic component; and
a correlator to correlate the broadcast analog television signal with a predetermined reference signal based on the periodic component, thereby producing a pseudorange; and wherein
the location of the user terminal is determined based on the pseudorange and a location of the transmitter of the broadcast analog television signal.

28. The apparatus of claim 27, further comprising:
a processor to determine the location of the user terminal based on the pseudorange and the location of the transmitter of the broadcast analog television signal.

29. The apparatus of claim 27, wherein:
the receiver receives parameters describing the predetermined reference signal; and
the processor generates the predetermined reference signal based on the parameters.

30. The apparatus of claim 27, wherein the periodic component is a horizontal synchronization pulse.

31. The apparatus of claim 30, wherein the processor identifies the peak of the result of the correlating, thereby producing the pseudorange.

32. The apparatus of claim 27, wherein:
the receiver receives parameters describing the derivative of the periodic component; and
the processor generates the predetermined reference signal based on the parameters and identifies the first zero crossing of the result of the correlating, thereby producing the pseudorange.

33. The apparatus of claim 32, wherein the periodic component is selected from the group comprising:
a horizontal synchronization pulse;
a horizontal blanking pulse; and
a horizontal blanking pulse and a horizontal synchronization pulse.

34. The apparatus of claim 33, wherein:
the correlator correlates the broadcast analog television signal with a second predetermined reference signal, the second predetermined reference signal based on the horizontal synchronization pulse, thereby producing a second correlation result; and
the processor identifies the peak of the second correlation result, thereby producing a second pseudorange, and produces a refined pseudorange based on the pseudorange and the second pseudorange; and wherein
the position of the user terminal is determined based on the refined pseudorange and the location of the transmitter of the broadcast analog television signal.

35. The apparatus of claim 27, wherein the periodic component is a chrominance burst, wherein the processor resolves ambiguity in the pseudorange resulting from cycle ambiguity in the chrominance burst.

36. The apparatus of claim 27, wherein:
the correlator correlates the broadcast analog television signal with a second predetermined reference signal, the second predetermined reference signal based on the horizontal synchronization pulse, thereby producing a second correlation result; and
the processor produces a second pseudorange based on the second correlation result and produces a refined pseudorange based on the pseudorange and the second pseudorange; and wherein
the position of the user terminal is determined based on the refined pseudorange and the location of the transmitter of the broadcast analog television signal.

37. The apparatus of claim 36, wherein:
the receiver receives parameters describing the derivative of a second periodic component; and
the processor generates the predetermined reference signal based on the parameters and identifies the first zero crossing of the result of the correlating, thereby producing the pseudorange; and wherein
the second periodic component is selected from the group comprising:
a horizontal synchronization pulse,
a horizontal blanking pulse, and
a horizontal blanking pulse and a horizontal synchronization pulse.

38. The apparatus of claim 27, wherein the position of the user terminal is determined by adjusting the pseudoranges based on a difference between a transmitter clock at the transmitter of the broadcast analog television signal and a known time reference, and determining the position of the user terminal based on the adjusted pseudorange and the location of the TV transmitter.

39. The apparatus of claim 27, wherein the processor:
determines a further pseudorange based on a further broadcast analog television signal; and projects the pseudorange and the further pseudorange to an instant of time, thereby eliminating any first order term in the clock of the user terminal.

40. Computer-readable media embodying instructions executable by a computer to perform a method for determining the position of a user terminal, the method comprising:

receiving, at the user terminal, a broadcast analog television signal having a periodic component; and correlating the broadcast analog television signal with a predetermined reference signal based on the periodic component, thereby producing a pseudorange; and wherein the location of the user terminal is determined based on the pseudorange and a location of the transmitter of the broadcast analog television signal.

41. The media of claim 40, wherein the method further comprises:

determining the location of the user terminal based on the pseudorange and the location of the transmitter of the broadcast analog television signal.

42. The media of claim 40, wherein the method further comprises:

receiving parameters describing the predetermined reference signal; and generating the predetermined reference signal based on the parameters.

43. The media of claim 40, wherein the periodic component is a horizontal synchronization pulse.

44. The media of claim 43, wherein the method further comprises:

identifying the peak of the result of the correlating, thereby producing the pseudorange.

45. The media of claim 40, wherein the method further comprises:

receiving parameters describing the derivative of the periodic component;

generating the predetermined reference signal based on the parameters; and identifying the first zero crossing of the result of the correlating, thereby producing the pseudorange.

46. The media of claim 45, wherein the periodic component is selected from the group comprising:

a horizontal synchronization pulse;

a horizontal blanking pulse; and a horizontal blanking pulse and a horizontal synchronization pulse.

47. The media of claim 46, wherein the method further comprises:

correlating the broadcast analog television signal with a second predetermined reference signal, the second predetermined reference signal based on the horizontal synchronization pulse, thereby producing a second correlation result;

identifying the peak of the second correlation result, thereby producing a second pseudorange; and producing a refined pseudorange based on the pseudorange and the second pseudorange; and wherein the position of the user terminal is determined based on the refined pseudorange and the location of the transmitter of the broadcast analog television signal.

48. The media of claim 40, wherein the periodic component is a chrominance burst, wherein the method further comprises:

resolving ambiguity in the pseudorange resulting from cycle ambiguity in the chrominance burst.

49. The media of claim 40, wherein the method further comprises:

correlating the broadcast analog television signal with a second predetermined reference signal, the second predetermined reference signal based on the horizontal synchronization pulse, thereby producing a second correlation result;

producing a second pseudorange based on the second correlation result; and producing a refined pseudorange based on the pseudorange and the second pseudorange; and wherein the position of the user terminal is determined based on the refined pseudorange and the location of the transmitter of the broadcast analog television signal.

50. The media of claim 49, wherein the method further comprises:

receiving parameters describing the derivative of a second periodic component;

generating the predetermined reference signal based on the parameters; and identifying the first zero crossing of the result of the correlating, thereby producing the pseudorange; and wherein the second periodic component is selected from the group comprising:

a horizontal synchronization pulse, a horizontal blanking pulse, and a horizontal blanking pulse and a horizontal synchronization pulse.

51. The media of claim 40, wherein the position of the user terminal is determined by adjusting the pseudoranges based on a difference between a transmitter clock at the transmitter of the broadcast analog television signal and a known time reference, and determining the position of the user terminal based on the adjusted pseudorange and the location of the TV transmitter.

52. The media of claim 40, wherein the method further comprises:

determining a further pseudorange based on a further broadcast analog television signal; and projecting the pseudorange and the further pseudorange to an instant of time, thereby eliminating any first order term in the clock of the user terminal.

* * * * *